United States Patent [19]
Watanabe et al.

[11] Patent Number: 5,717,848
[45] Date of Patent: Feb. 10, 1998

[54] METHOD AND APPARATUS FOR GENERATING OBJECT MOTION PATH, METHOD OF SETTING OBJECT DISPLAY ATTRIBUTE, AND COMPUTER GRAPHICS SYSTEM

[75] Inventors: Norito Watanabe; Atsushi Kawabata; Tsugio Tomita; Toshio Sakai; Yasuo Sasaki; Yoshiaki Usami; Akihiro Sakamoto, all of Hitachi; Kengiro Sato, Ibaraki-ken, all of Japan

[73] Assignee: Hitachi, Ltd., Tokyo, Japan

[21] Appl. No.: 359,780

[22] Filed: Dec. 20, 1994

Related U.S. Application Data

[63] Continuation of Ser. No. 713,151, Jun. 11, 1991, abandoned.

[30] Foreign Application Priority Data

Jun. 11, 1990 [JP] Japan ................................. 2-150021
Nov. 21, 1990 [JP] Japan ................................. 2-314435
Nov. 28, 1990 [JP] Japan ................................. 2-322884

[51] Int. Cl.$^6$ ............................................ G06T 15/70
[52] U.S. Cl. ..................... 395/174; 395/349; 395/142; 395/951
[58] Field of Search ..................... 395/152, 133, 395/136, 138, 142, 143, 173–175, 348–350, 339, 949–960; 345/122, 126; 364/424.06, 427–428, 444, 474.22, 474.24–474.27, 474.31; 434/43

[56] References Cited

U.S. PATENT DOCUMENTS

| | | | |
|---|---|---|---|
| 4,348,731 | 9/1982 | Kogawa | 364/513 |
| 4,600,919 | 7/1986 | Stern | 340/725 |

(List continued on next page.)

FOREIGN PATENT DOCUMENTS

2-199579  8/1990  Japan .

OTHER PUBLICATIONS

Kerlick, G. David, "Moving Iconic Objects in Scientific Visualization", Proceedings of the First IEEE Conference on Visualization, Oct. 1990, pp. 124–130.

Girard, Michael, "Interactive Design of 3D Computer-Animated Legged Animal Motion", IEEE Computer Graphics and Applications, vol. 7, No. 6 (Jun. 1987), pp.. 39–51.

Maciejewski, Anthony A., and Klein, Charles A., "Sam-Animation Software for Simulating Articulated Motion", Computers and Graphics, vol. 9, No. 4, 1985, pp. 383–391.

Ohta et al., "ASCII Learning System (3) Application Cause, Applied Graphics", ASCII, 1986, pp. 105–126.

Foley, James D., and Van Dam, Andries, "Fundamentals of Computer Graphics", 1982, pp. 514–519.

*Primary Examiner*—Joseph H. Feild
*Attorney, Agent, or Firm*—Kenyon & Kenyon

[57] ABSTRACT

There are provided apparatuses for generating the motion path of an object. One apparatus includes an input unit for inputting information representative of the position of a start point of the motion of an object, at least one of the magnitude and direction of a velocity at the start point, an end point of the motion of the object, and at least one of the magnitude and direction of a velocity at the end point, and a calculation unit for calculating a motion path from the start point to the end point, in accordance with the information inputted to the input unit. As an alternative of the position and velocity of an object, the rotary angle and angular velocity of an object may be used to represent the facing direction of the object. Another apparatus includes a display device for displaying information of the position of an object and an icon representative of the time corresponding to the position of the object, and a calculator for calculating information representative of the motion path, in accordance with the information entered by the icon and information representative of at least one of the magnitude and direction of a velocity at the position of the object. The motion path is then displayed on the screen. The motion of an object can be easily defined and smoothly coupled to a succeeding or preceding motion on each key frame. The path and/or surface reflection attribute of an object can be defined with a small number of procedures.

21 Claims, 29 Drawing Sheets

U.S. PATENT DOCUMENTS

| | | | |
|---|---|---|---|
| 4,628,456 | 12/1986 | Hatano et al. | 364/449 |
| 4,644,460 | 2/1987 | Kishi et al. | 364/171 |
| 4,646,228 | 2/1987 | Ikeda | 364/192 |
| 4,797,836 | 1/1989 | Witek et al. | 395/152 |
| 4,853,603 | 8/1989 | Onoue et al. | 318/568.15 |
| 4,858,140 | 8/1989 | Bühler et al. | 364/474.31 |
| 4,905,147 | 2/1990 | Logg | 364/410 |
| 4,949,270 | 8/1990 | Shima et al. | 364/474.26 |
| 4,952,051 | 8/1990 | Lovell et al. | 352/87 |
| 5,025,382 | 6/1991 | Artz | 364/439 |
| 5,053,760 | 10/1991 | Frasier et al. | 340/725 |

POINT CONSTRAINT
(CONSTRAINING CAMERA ANGLE TO ONE POINT)

LINE CONSTRAINT
(CONSTRAINING CAMERA ANGLE TO STRAIGHT LINE)

PLANE CONSTRAINT
(CONSTRAINING CAMERA ANGLE TO PLANE)

SPEED VECTOR CONSTRAINT
(CONSTRAINING CAMERA ANGLE TO VELOCITY VECTOR)

1

METHOD AND APPARATUS FOR GENERATING OBJECT MOTION PATH, METHOD OF SETTING OBJECT DISPLAY ATTRIBUTE, AND COMPUTER GRAPHICS SYSTEM

This is a continuation of application Ser. No. 07/713,151, filed Jun. 11, 1991, now abandoned.

BACKGROUND OF THE INVENTION

The present invention relates to a technique of inputting and displaying information used for processing images and graphics. More particularly, the present invention relates to a method of setting object display attributes and a method of generating an object motion path, suitable for three-dimensional computer graphics.

In a three-dimensional computer graphics system, as described in "Practical Computer Graphics, Fundamental Procedures and Applications", Nikkan Kogyo Shinbun Co. Ltd., at page 390, in order to realize a material image quality of an object, it is necessary to set the colors of ambient light components, diffuse light components, and specular light components. A method of setting a motion of animation is discussed in "ASCII Learning System (3) Application Course, Applied Graphics", Ohta, et al (1986), pp.105 to 126. According to this method, a key frame is provided every one second, the position of an object at each key frame is designated, and intermediate images are provided through interpolation using linear or higher-order spline curves. There is also known Japanese Patent Laid-open Publication JP-A-2-199579 in which after a motion locus is entered, motion velocities at positions on the locus are independently inputted at predetermined time intervals.

With the above-described conventional techniques, it is necessary to enter a large amount of information to animate the graphic image. This poses a considerable obstacle against providing a system which permits anybody to use it easily.

For example, many parameters are required to determine a surface reflection attribute. A great deal of skill and expert knowledge are required to set proper values of these parameters.

Furthermore, for defining the motion for animation, it is necessary to designate both the position and facing direction or angle of an object by using a key frame. It is therefore necessary for an operator to determine the position of an object while considering also the velocity and facing direction of the object.

SUMMARY OF THE INVENTION

It is an object of the present invention to define motions such that the definitions can be easily coupled to provide smooth coupling of the motions.

It is another object of the present invention to determine the path and/or surface reflection attribute of an object with a small number of procedures.

It is a further object of the present invention to provide a means for dynamically changing one of the following parameters: position of an object, the magnitude and direction of an object velocity, and time. This permits an easy definition.

In order to achieve the above objects of the present invention, the position of an object and at least one of the magnitude and direction of the velocity of the object velocity are designated for each key frame.

In order to facilitate designation of the position of an object, and the magnitude and direction of an object velocity, the position of an object is displayed as the start point of a vector representation, and the magnitude and direction of an object velocity are displayed as the length and orientation of the vector. An input means is provided for dynamically changing the vector representation.

In order to designate a given object motion path more finely, a new key frame is generated by providing a new velocity at an optional point designated on the path between the start and end points.

A means is provided which independently defines a specific color of an object and its surface reflection attribute for designating the surface attribute of the object. For example, information regarding specific colors and surface reflection attributes of objects is stored as a library, so that a combination of a specific color and surface reflection attribute can realize a desired material image quality.

For the motion definition of animation, a means is provided which separates the motion of an object into the position of the object at a certain time and into its facing direction, to thereby define the motion of the object independently.

For setting the position of an object, both or one of the position and velocity of an object at each key frame is used so that a computer can automatically generate a motion path between key frames.

Similarly, for setting the facing direction of an object, both or one of the facing direction of an object and its angular velocity at each key frame is used so that a computer can automatically generate the facing direction of the object between key frames. For example, particularly for the control of the facing direction of an object, there is provided a certain restriction in order to allow an easy setting, such as a setting for an image display wherein a camera takes an object always at the center of a frame.

According to a first embodiment of the present invention, an apparatus for generating the motion path of an object comprises:

input means for inputting information representative of the position of a start point of the motion of an object, information representative of at least one of the magnitude and direction of a velocity at the start point of the motion of the object, information representative of an end point of the motion of the object, and information representative of at least one of the magnitude and direction of a velocity at the end point of the motion of the object; and means for calculating information representative of a motion path from the start point to the end point of the motion of the object, in accordance with the information representative of the position of the start point of the motion of the object, the information representative of at least one of the magnitude and direction of the velocity at the start point of the motion of the object, the information representative of the end point of the motion of the object, and the information representative of at least one of the magnitude and direction of the velocity at the end point of the motion of the object.

According to a second embodiment of the present invention, an apparatus for generating the motion path of an object comprises:

input means for inputting information representative of the position of a moving object, and information representative of the facing direction of the moving object; and means for calculating information representative of the motion path of the moving object, in accordance with the information representative of the position of the moving object and the information representative of the facing direction of the moving object.

According to a third embodiment of the present invention, an apparatus for generating the motion path of an object comprises:

means for displaying information on a display screen, the information being representative of the position of a moving object;

means for displaying an icon in the display, the icon being representative of the time corresponding to the position of the moving object;

means for calculating information representative of the motion path of the moving object, in accordance with the information representative of the time corresponding to the position of the moving object and inputted by means of the icon and information representative of at least one of the magnitude and direction of a velocity at the position of the moving object; and means for displaying information on the display screen, the information being representative of the motion path of the moving object.

The other objects and advantages of the present invention will become apparent from the following description of the embodiments.

DETAILED DESCRIPTION

An embodiment of the present invention will be described with reference to the accompanying drawings, giving by way of example three-dimensional computer graphics animation.

Figure 1:
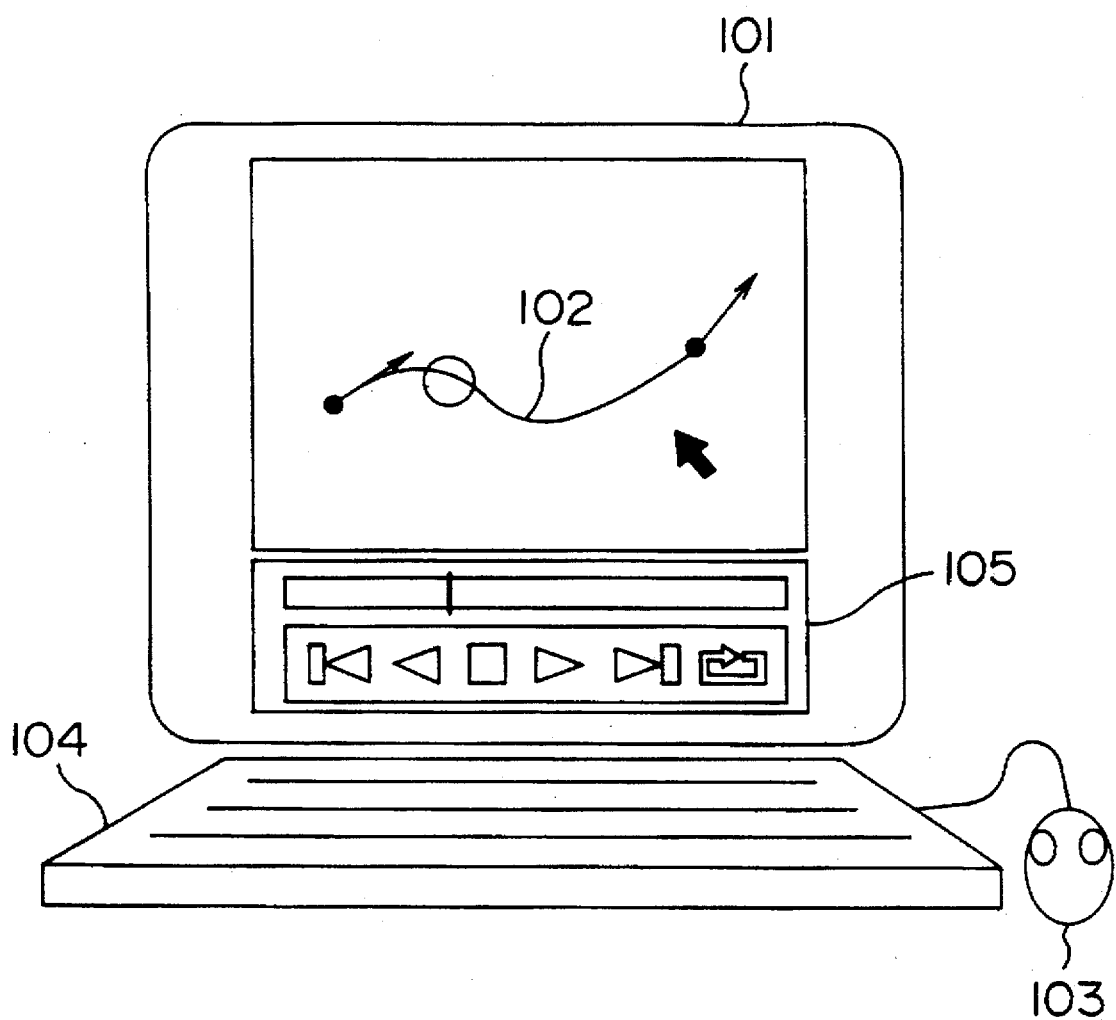
FIG. 1 illustrates an example of an operation according to an embodiment of the present invention.

FIG. 1 illustrates a definition environment of animation according to the present invention. Using a mouse 103 as a pointing device, keyboard 104, or the like serving as an input means, an operator determines a motion path or course of an object displayed on a screen 101 of a display such as a liquid crystal display (LCD), and then realizes animation upon actuation of a control panel 105.

Figure 2:
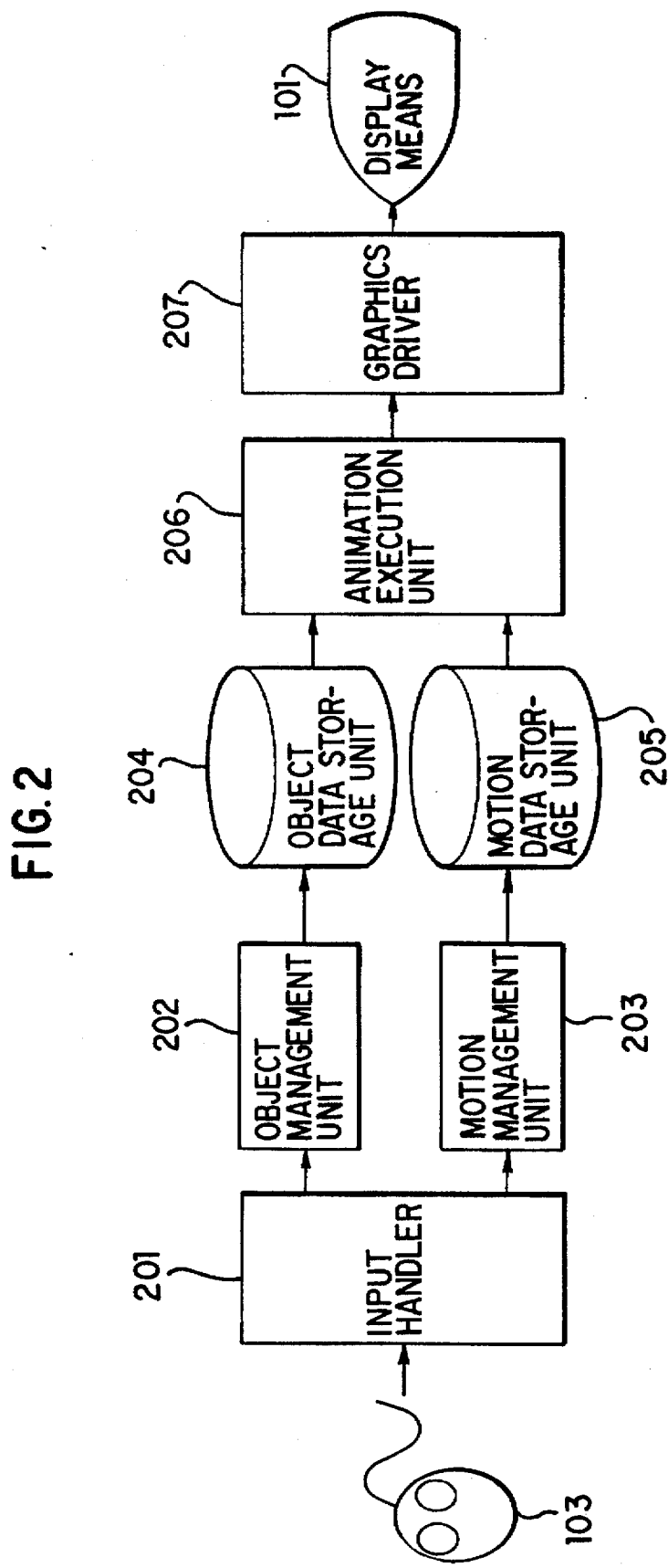
FIG. 2 shows the system arrangement according to the embodiment of the present invention.

FIG. 2 shows the structure of this system. An event designated by an operator using the input means such as the mouse 103 is interpreted by an input handler 201 which gives an instruction to an object management unit 202 if the event is an operation of the object, and to a motion management unit 203 if the event is a motion change instruction.

The object management unit 202 manages to generate and change a shape data of an object to be moved as animation, and stores the shape data into an object data storage unit 204. The motion management unit 203 manages to generate and change the motion of an object, and stores motion definition data into a motion data storage unit 205. A path data of motion is also stored in the motion data storage unit 205.

When an operator instructs to realize animation of an object on the screen 101 by actuating the control panel 105, the generated shape data of the object and the motion data are read by an animation executing unit 206 which in turn converts the read data into a graphics function train and instructs a graphics driver 207 to display it. An animation is then displayed on the display screen 101.

The path setting procedure by the motion management unit 203, which is the main part of this embodiment will now be described.

The motion management unit 203 executes the following processing in the case where a path designation is made by using a velocity vector. First, times which define a motion are entered from the control panel 105. The entered times are stored as the times associated with respective key frames. The time at the start point of a start point key frame is represented by T0, and the time at the end point of an end point key frame is represented by Tn. Next, the positions of the start and end points are designated. The designated positions are represented by three-dimensional coordinates (X0, Y0, Z0) and (Xn, Yn, Zn).

Then, the velocities are calculated. The velocities are calculated as given below such that they produce a uniform motion from the start point to the end point.

$$Vx=(Xn-X0)/(Tn-T0)$$

$$Vy=(Yn-Y0)/(Tn-T0)$$

$$Vz=(Zn-Z0)/(Tn-T0)$$

The velocity vectors are displayed using the calculated velocity components. The velocity vectors are displayed near at the start and end points of the locus. Namely, the velocity vector at the start point is given for a vector start point coordinate: by (X0, Y0, Z0), and for a vector end point coordinate: by (X0+K*Vx, Y0+K*Vy, Z0+K*Vz).

K is a coefficient used for making the vector representation easily recognizable.

The vector at the end point is obtained in the similar manner.

If the path is to be changed or corrected, the following procedure is executed. First, using the input means 103 such as a mouse, the path or velocity vector to be changed is designated.

In the case where a velocity vector is designated and the position of the designated velocity vector is the vector start point, the start point position of the vector is changed to the present cursor position. Similarly, in the case where the designated position is the Vector end point, the end point position of the vector is changed to the present cursor position. If the designated position is neither the vector start point nor the end point, the vector is parallel displaced to follow the motion of the cursor. If a path line is designated, the velocity vectors both at the start and end points of the path are parallel displaced to make the path and velocity vectors follow the motion of the cursor.

The motion path is obtained in the following manner, using the velocity vectors set in the above manner.

Figure 3:
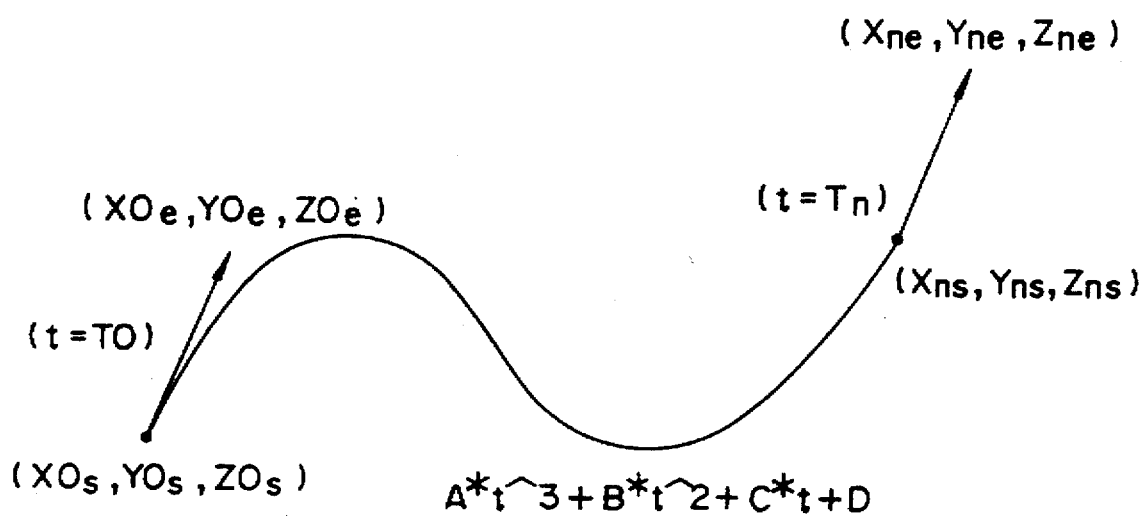
FIG. 3 shows a display example of path data.

The start and end point coordinates of the set vectors are assumed as shown in FIG. 3.

A velocity vector at the start point frame (t=T0) of the path has a vector start point coordinate: $(X0s, Y0s, Z0s)$, and a vector end point coordinate: $(X0e, Y0e, Z0e)$ (1)

A velocity vector at the end point frame (t=Tn) of the path has a vector start point coordinate: $(Xns, Yns, Zns)$, and a vector end point coordinate: $(Xne, Yne, Zne)$ (2)

The inputted and designated velocities can be calculated as in the following.

A velocity of the start point frame (t=T0) of the path is $V0x=(X0e-X0s)/K$ $V0y=(Y0e-Y0s)/K$ $V0z=(Z0e-Z0s)/K$ (3)

A velocity of the end point frame (t=Tn) of the path is $Vnx=(Xne-Xns)/K$ $Vny=(Yne-Yns)/K$ $Vnz=(Zne-Zns)/K$ (4)

Interpolation of the path is performed using the following third order polynomial using time as a parameter.

$x=Ax*t^3+Bx*t^2+Cx*t+Dx$ $y=Ay*t^3+By*t^2+Cy*t+Dy$ $z=Az*t^3+Bz*t^2+Cz*t+Dz$ (5)

With the path equations given as above, the velocity is obtained as shown below by differentiating them once.

$Vx=3*Ax*t^2+2*Bx*t+Cx$ $Vy=3*Ay*t^2+2*By*t+Cy$ $Vz=3*Az*t^2+2*Bz*t+Cz$ (6)

The Equations (1) and (2) for the start and end point positions and the Equations (3) and (4) for the velocities at the start and end positions are substituted into the Equations (5) and (6) so that twelve equations are obtained with twelve unknown values, thereby unanimously determining the unknown values Ax, Bx, Cx, Dx, Ay, By, Cy, Dy, Az, Bz, Cz, and Dz.

The path can be obtained from the equation (5) by changing the time from t=T0 to t=Tn. By plotting positions on the screen at each unit time, a path line can be drawn on the screen as the path locus.

The above processing for drawing a path line is carried out each time the mouse coordinate changes, allowing a dynamic change of the path and a determination of the path while recognizing the moving point of an object.

Figure 4:
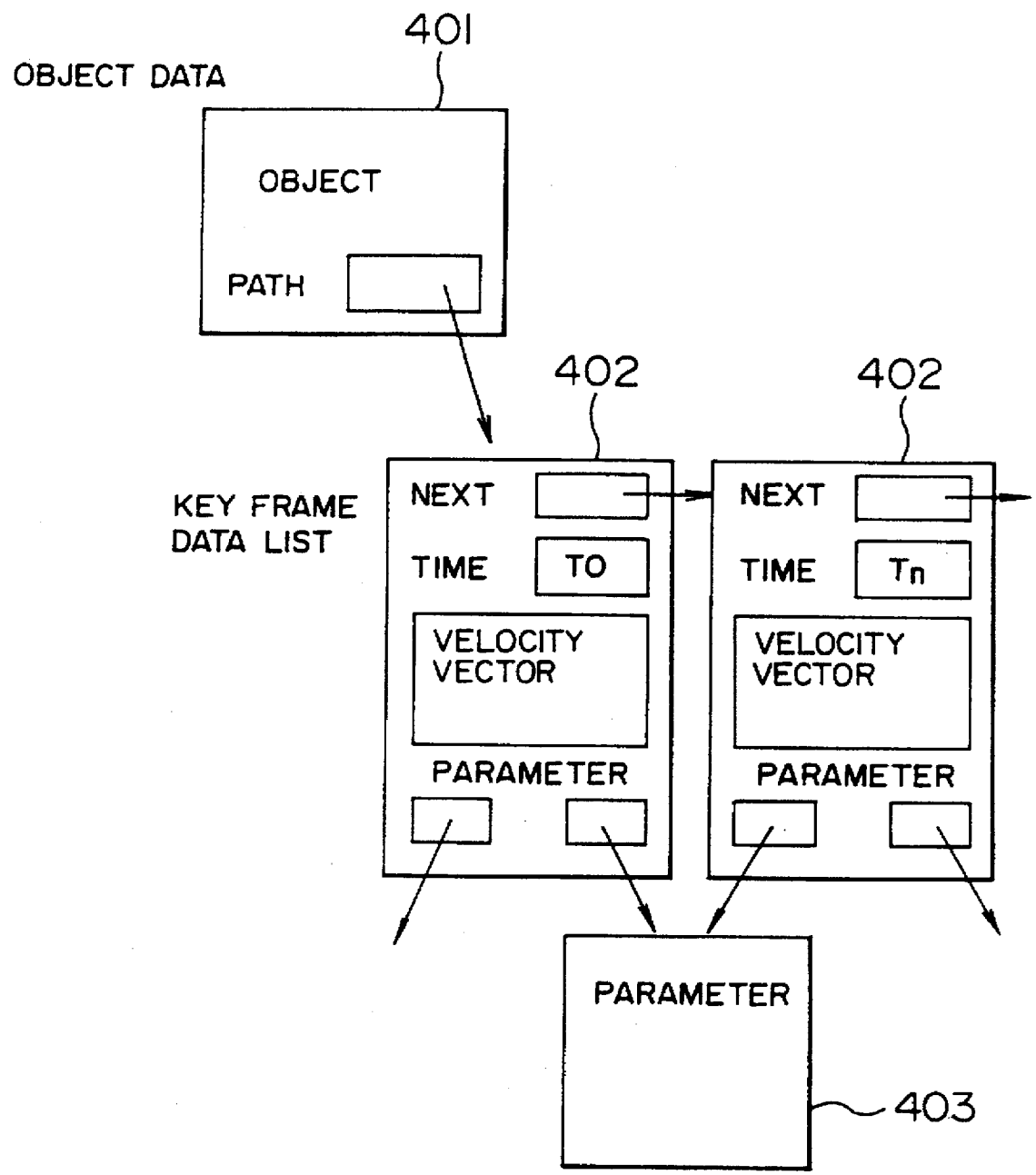
FIG. 4 is a diagram showing the structure of key frame data management.

FIG. 4 illustrates the path data management structure. Each object is managed by an object management node 401 in the object data storage unit 204. The motion path of an object can be searched from the object management node 401, the motion path being stored as a key frame data list 402 in the motion data storage unit 205. Each node of the key frame data list corresponds to each key frame having been set, the node having a time for the key frame, the start and end points of a velocity vector, a pointer to the next key frame, and a pointer to a parameter table 403 for the obtained path. The parameter table is identified by the preceding and succeeding key frame nodes.

Figure 5A:
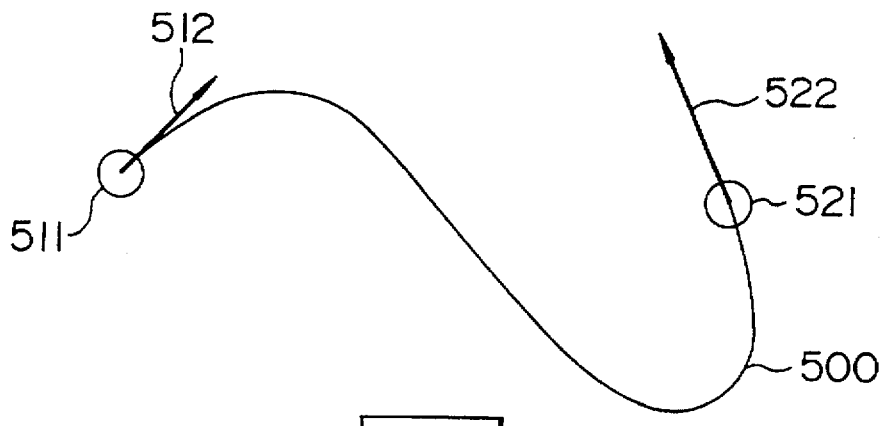
FIGS. 5a–5c show diagrams illustrating a display example of a procedure of changing a path.
Figure 5B:
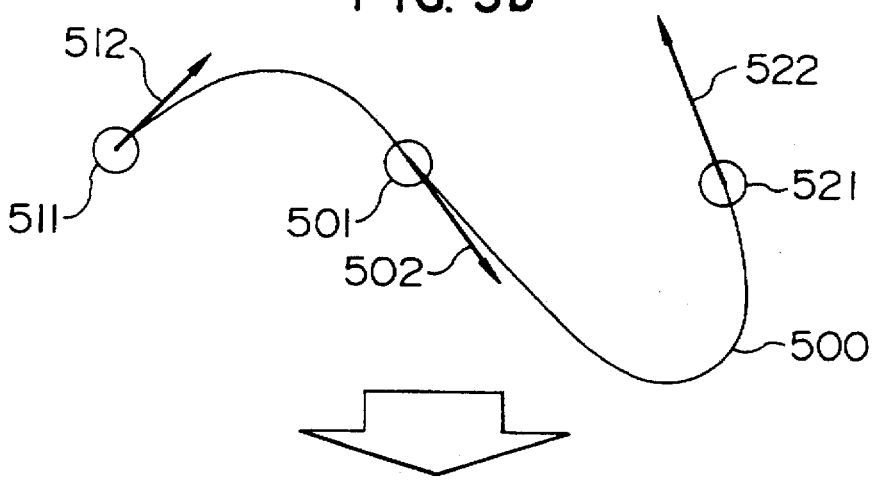
Figure 5C:
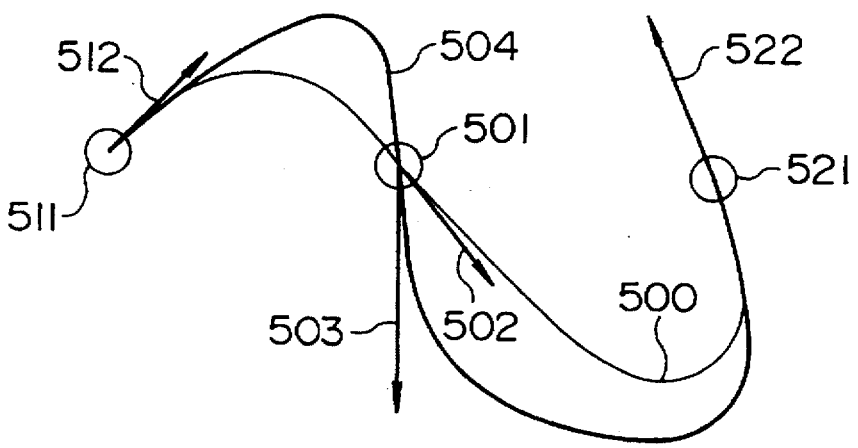

The motion path set and displayed on the display screen 101 may be changeably designated more finely as illustrated in FIGS. 5a–5c. FIG. 5a shows a path 500 already displayed on the display screen 101, a start point 511, a start point velocity 512, an end point 521, and an end point velocity 522. First, as shown in FIG. 5b, a new key frame is designated. An operator enters from the input device a position 501 where the path is to be corrected or changed, the position being thereby displayed on the display screen. The time for the designated point can be obtained from the Equation (5). This time is used as the time for the new key frame, and a new key frame node is formed and inserted into the key frame data list at the position corresponding to the time. The velocity vector data at this time can be obtained from the Equation (6) using the time. The obtained velocity vector 502 is displayed on the display screen at the designated position. The position to be changed, 501, may be displayed at the same time when the calculated velocity vector 502 is displayed.

The processing of changing a velocity vector is carried out in the same manner as described above. It is to be noted, however, that the velocity vector to be changed is processed both as the end point data of the path extending from the preceding key frame and as the start point data of the path extending to the succeeding key frame, to thereby enable to change the preceding and succeeding paths at the same time. With this arrangement, the paths and velocities before and after the newly set key frame can be coupled smoothly. For example, in FIG. 5, in changing the velocity 502 to a velocity 503, a new path 504 can define a smooth motion. As shown in FIG. 5c, the path 500 and the new path 504 may be displayed at the same time. In this case, it is preferable to display the path 500 in the form of a fine line, broken line, or with a first color, and to display the path 504 in the form of a bold line, solid line, or with a second color, so as to make them discernible by an operator. The path 504 only may be displayed.

On the contrary, if the motion is intended to be changed quickly, two key frames having a different velocity vector are set for the same time. An operator designates if the motion is to be coupled smoothly or quickly. If the end point position and time of a certain path are near the start point position and time of another path to some degree, and if an operator selects a smooth couple therebetween, the management of the two paths is changed to the management of one path. Namely, one of the key frame nodes 402 is deleted to manage the end point and start point as being had by the same key frame node.

Animation is realized in the following manner. First, an operator enters an animation execution instruction from the control panel 105. It is assumed that the number of frames per second is preset to N frame/sec. At each 1/N unit time after the start of animation, it is determined which parameter table 403 between key frame nodes 402 is used for an object. The position coordinate of the object is obtained from the Equation (5) using the data in the determined parameter table. The above processes are repeated until animation is completed. In this manner, the object moves as time lapses, thereby realizing animation.

Figure 6:
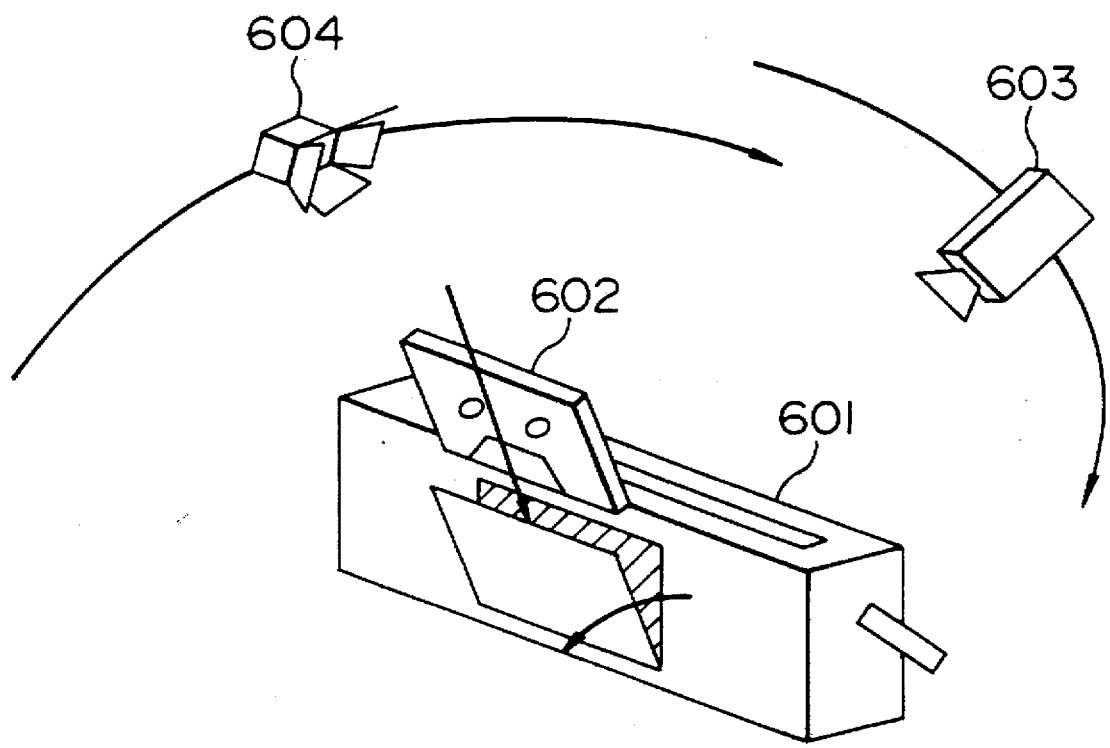
FIG. 6 is a diagram showing an example of an application to a presentation system.

By using the apparatus and method of generating a motion path of this embodiment, it is possible to define animation to be used for industrial product presentation. For example, as shown in FIG. 6, the motion of an actual product at each part 601, 602, the motion of a camera 603, and the motion of a light source 604 are determined in accordance with the method of the present embodiment. The product, camera, and light source correspond to the above-described object, the motion path thereof being controlled using velocity vectors. The discontinuity of the motion, particularly the motion of the camera, is greatly reflected to a visual sense, and in this context the embodiment method provides considerably advantageous effects.

Figure 7:
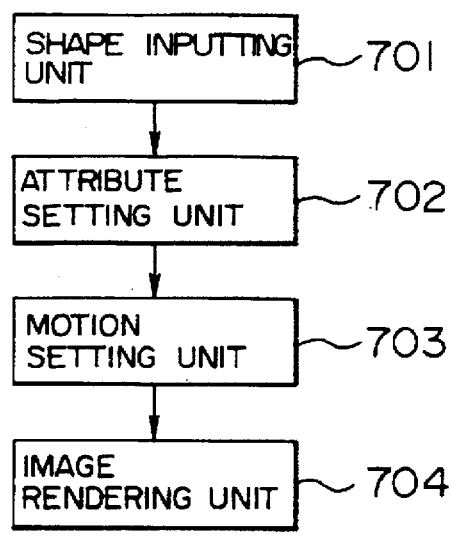
FIGS. 7–17, 18A–18B, 19A–19B, 20A–20B, 21A–21B, and 22–29 show other embodiments of the present invention.

Another embodiment of the present invention will be described with reference to FIG. 7. A shape inputting and processing unit 701 is a unit for inputting a three-dimensional shape. The shape inputting and processing unit 701 affine-transforms the inputted shape. An attribute setting unit 702 interactively sets an attribute of an object with respect to the shape data defined by the shape inputting and processing unit 701. The term "attribute" herein used includes a color specific to an object, a display reflection attribute, and a way to execute mapping. A camera attribute and a light source attribute are also set interactively. The camera attribute includes virtual camera parameters used when an image is reproduced, i.e., an angle of view, a focal length, and a shutter speed. The light source attribute includes the type of a light source, i.e., an attribute for designating one of a collimated light source, a point light source, and a spot light source, and the color and intensity of radiated light. A motion setting unit 703 sets the motions of all objects. The motion of an object is represented by the position and facing direction of an object at a certain time. The motions of a camera and a light source are set in quite the same manner as that of an object. The motion setting unit 703 also designates an attribute which changes with time, while operating in parallel with the attribute setting unit 702. An image rendering unit 704 generates an animation image by using the data defined by the shape inputting and processing unit 701, attribute setting unit 702, and motion setting unit 703.

Next, there will be described a method of determining an object specific color, surface reflection attribute, and light source attribute, this method being used with this embodiment. In the actual phase, the characteristics of a light reflected from the surface of an object depend not only on the characteristics of a light illuminating an object, but also on the characteristics of the surface of the object. In the field of computer graphics, a desired material image quality is obtained by using the characteristics of the surface of an object. Light reflected from the surface of an object is classified into a diffuse light and a specular light. The diffuse light corresponds to the components of light which once entered an object and then are unidirectionally radiated from the surface of the object. The specular light corresponds to the components of light which are mirror-reflected at the surface of an object. In this embodiment, while considering the above circumstances, the luminance at each point on the surface of an object is determined using the following equation.

$$I=Ib*Ka+If*Kd* \cos(A)+If*Ks*W(B)+Ks*R(C)+Kt*T(D) \quad (7)$$

In the Equation (7), I represents a determined luminance on an object surface, If and Ib represent a parameter indicating the characteristics of a light source, Ka, Kd, Ks, and Kt represent a parameter indicating the characteristics of an object surface. The Equation (7) is calculated independently for each color component.

The second term of the Equation (7) is a term representing the Lambent cosine rule which is applied when light from a light source is perfectly diffused and reflected. In the second term, If is a factor indicating the color of the light source, Kd is a factor indicating an intensity of diffuse reflection, and A of cos(A) is an angle between a line normal to the object surface and the direction of the light source as viewed from the object surface. This term indicates the components of color specific to an object such as plastic and plaster. The first term of the Equation (7) indicates the components of ambient light other than the light source, and is used for preventing a portion of an object from becoming blackish, the portion being not illuminated directly from the light source. Ib of the first term is a factor indicating the color and intensity of ambient light, and Ka is a factor indicating the reflection intensity of ambient light. The third term of the Equation (7) indicates the components of specular light, and is applied to the case where a light from the light source is mirror-reflected at the object surface. In the third term, If has the same value as that of the second term, and indicates the color of the light source. Ks is a factor indicating the intensity of specular reflection, B of W(B) is an angle between the direction of an angle of view and the direction of normal reflection at the mirror surface, and W is a function indicating an attenuation when the angle of view shifts from the direction of normal specular reflection. The fourth term of the Equation (7) indicates the components of an image of another object reflected to the object surface. In the fourth term, Ks has the same value as that of the third term, and is a factor indicating the intensity of specular reflection. R(C) is a factor indicating an image reflected upon the object surface, the factor being determined by a method such as a ray tracing method. The fifth term of the Equation (7) indicates the components of light transmitted through an object. In the fifth term, Kt is a factor indicating an intensity of transmitted light, T(D) is a factor indicating a transmitted light image which is determined by a method such as a ray tracing method while considering a refraction coefficient and the like.

The specular reflection components and reflected image components perform an important role in realizing a material image quality of an object. For example, the specular reflection components of an object such as plastic have the same color as that of a light source, and those of a metal, solid paint and the like have a different color from that of a light source. For example, if red plastic is illuminated by a white light, the specular reflection components become white, whereas if a copper is illuminated by the same white light, the specular reflection components become red.

Figure 8:
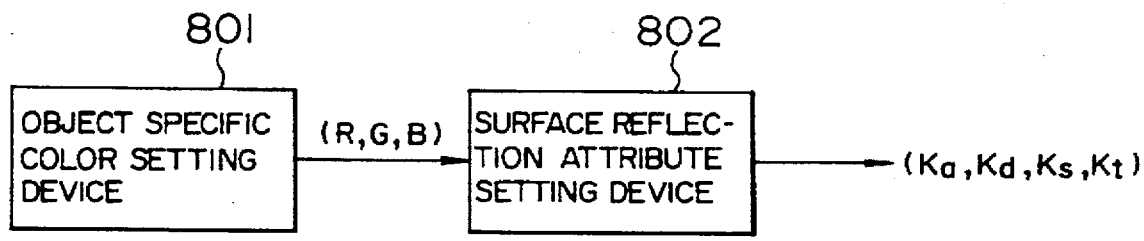

A practical system for determining a luminance on an object will be described with reference to FIG. 8. An object specific color setting device 801 determines a specific color of an object. For example, for realizing the material image quality of red plastic or copper, red is determined as a specific object color. The specific object color setting device 801 uses, for example, three primary colors, red, green, and blue, and an operator designates the intensities thereof to realize a desired hue. A computer shows selectable color candidates to an operator. In this case, as an operator selects one of the color candidates, the object specific color setting device 801 calls a combination of stored red, green, and blue colors to use them as object specific colors. A surface reflection attribute device 802 receives the object specific colors, and calculates the parameters Ka, Kd, Ks, and Kt of the Equation (7).

Figure 9:
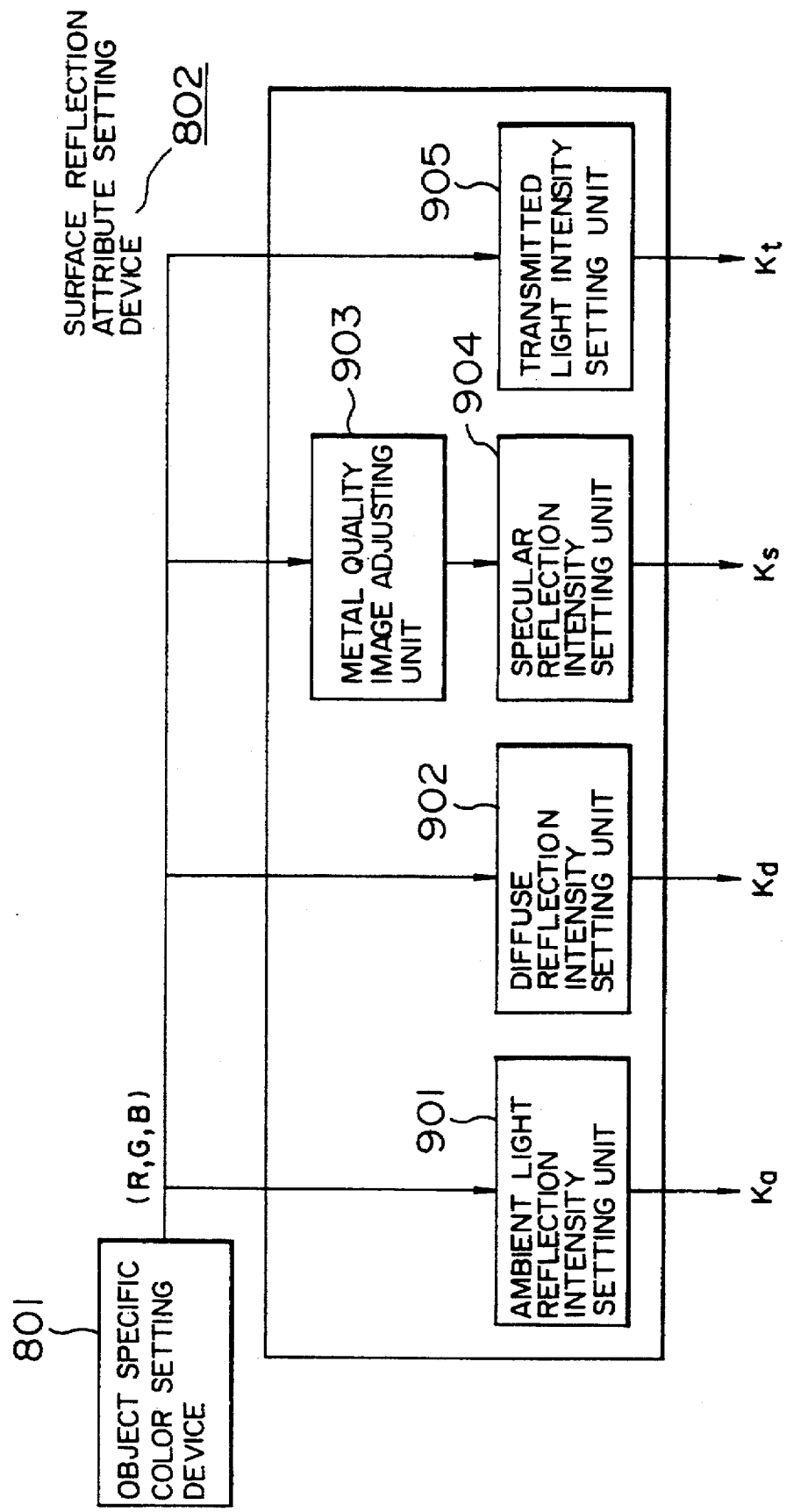

FIG. 9 shows the details of the surface reflection attribute setting device 802 for setting a surface reflection attribute. In FIG. 9, an ambient light reflection intensity setting unit 901 receives the specific color of an object, modulates the intensity component to calculate Ka of the Equation (7). Modulation of the intensity component can be achieved, for example, by first converting the object specific color into the ELS color model and then by adjusting the lightness component. A diffuse reflection intensity setting unit 902 receives the object specific color, and modulates the intensity component to calculate Kd of the Equation (7). A metal image quality adjusting unit 903 receives the object specific color, and modulates the saturation component. Modulation of the saturation component can be achieved, for example, by first converting the object specific color into the ELS color model and then by adjusting the saturation component. A specular reflection intensity setting unit 904 receives the specific color of the saturation modulated object, and modulates the intensity component to calculate Ks of the Equation (7). A transmission light intensity setting unit 905 receives the object specific color, and modulates the intensity component to calculate Kt of the Equation (7). Ka, Kd, Ks, and Kt comprise vector information representative of color information, and are represented for example by the intensity of each component of red, green, and blue.

For a unit for setting the surface reflection attribute, a method may be used wherein a computer shows selectable candidates of an surface reflection attribute to an operator. In this case, as an operator selects one of the candidates, the object specific color inputted to the surface reflection attribute setting unit 802 and the parameter given upon an operator's instruction are used to calculate and output the parameters Ka, Kd, Ks, and Kt.

Figure 10:
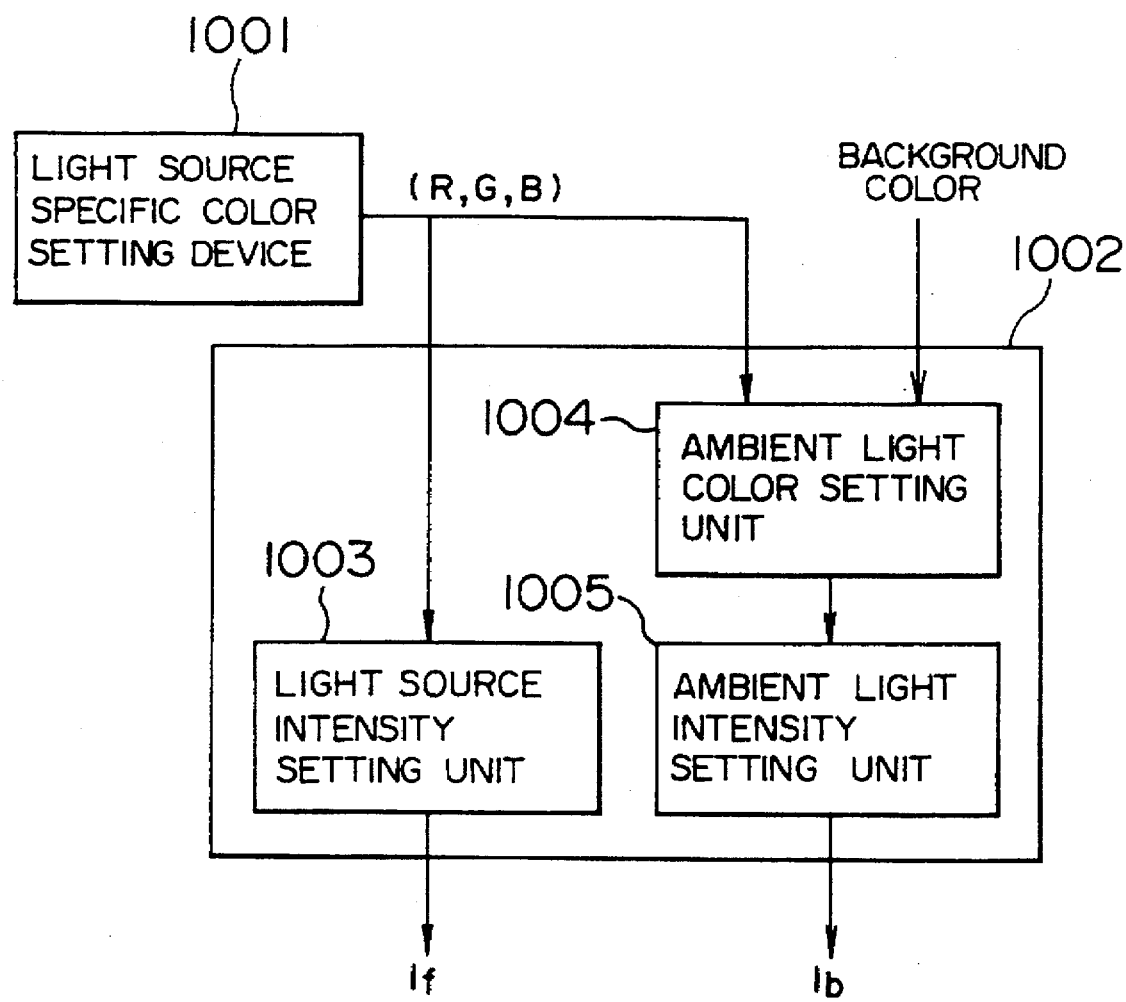

FIG. 10 shows a device for setting a light source attribute. A light source specific color setting unit 1001 determines the specific color of a light source. A light source specific color setting unit 1002 uses three primary colors, red, green, and blue, and an operator designates the intensities thereof to realize a desired hue. A computer shows selectable color candidates to an operator. In this case, as an operator selects one of the candidates, the light source specific color setting unit 1001 calls a combination of stored red, green, and blue to use them as light source specific colors. A light source intensity setting unit 1003 receives the light source specific color, and modulates the intensity component to calculate If of the Equation (7). An ambient light color setting unit 1004 receives the light source specific color and a background color, and performs interpolation therebetween to output the result. An ambient light intensity setting unit 1005 receives data from the ambient light color setting unit 1004, and modulates the intensity component to calculate Ib of the Equation (7).

Figure 11:
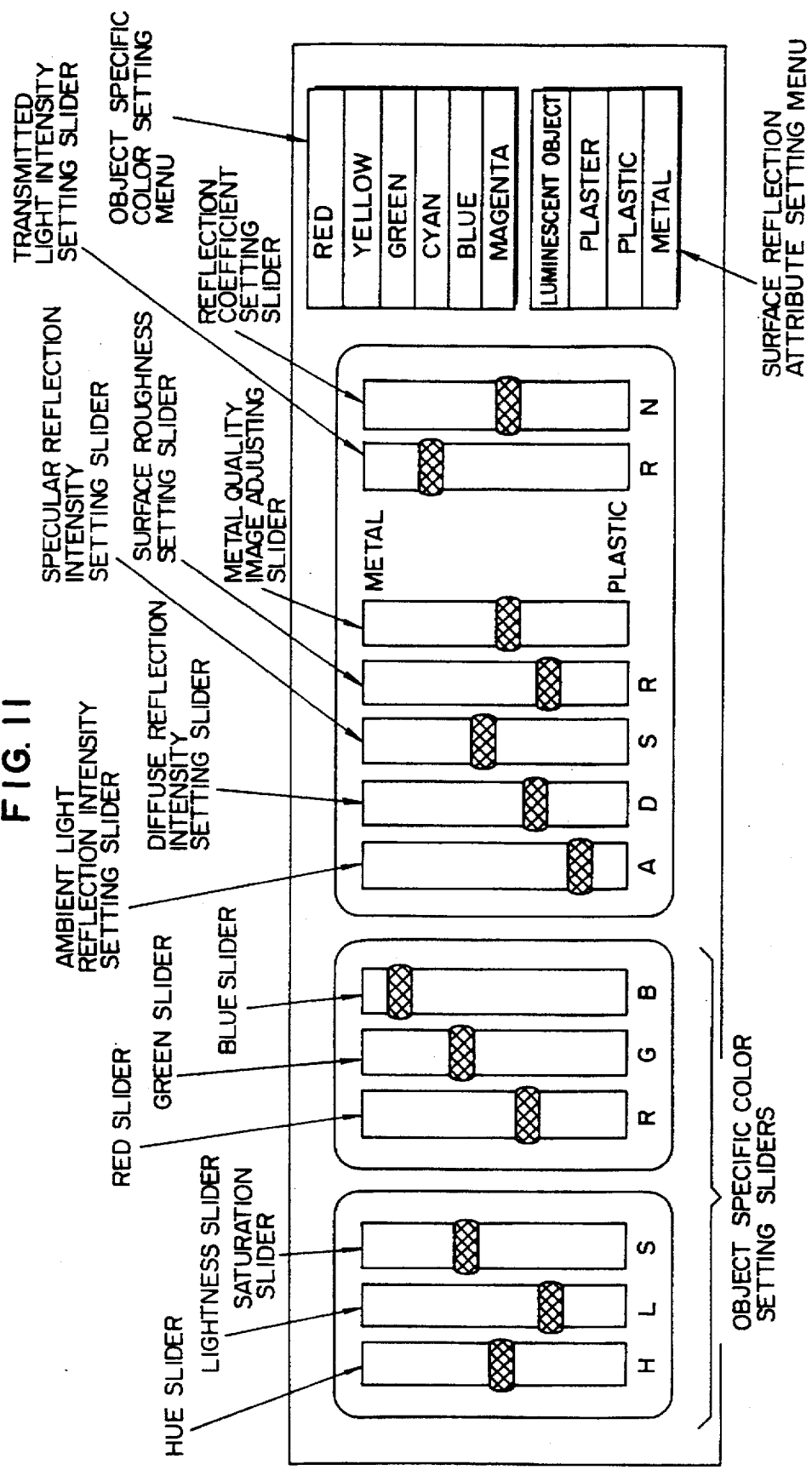
Figure 12:
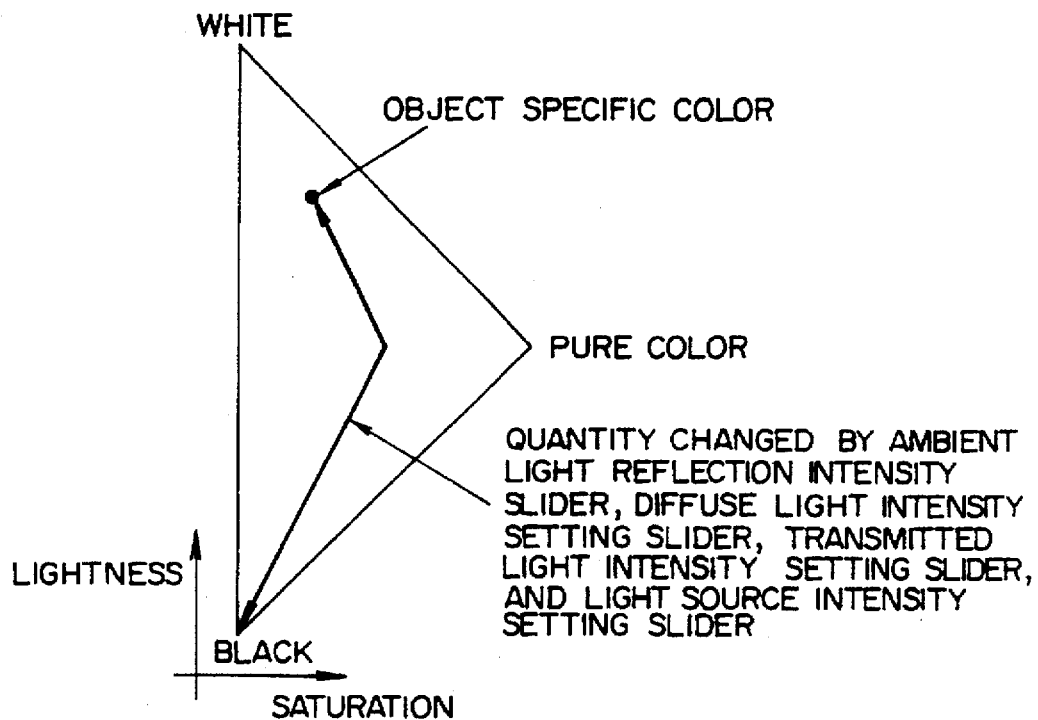
Figure 13:
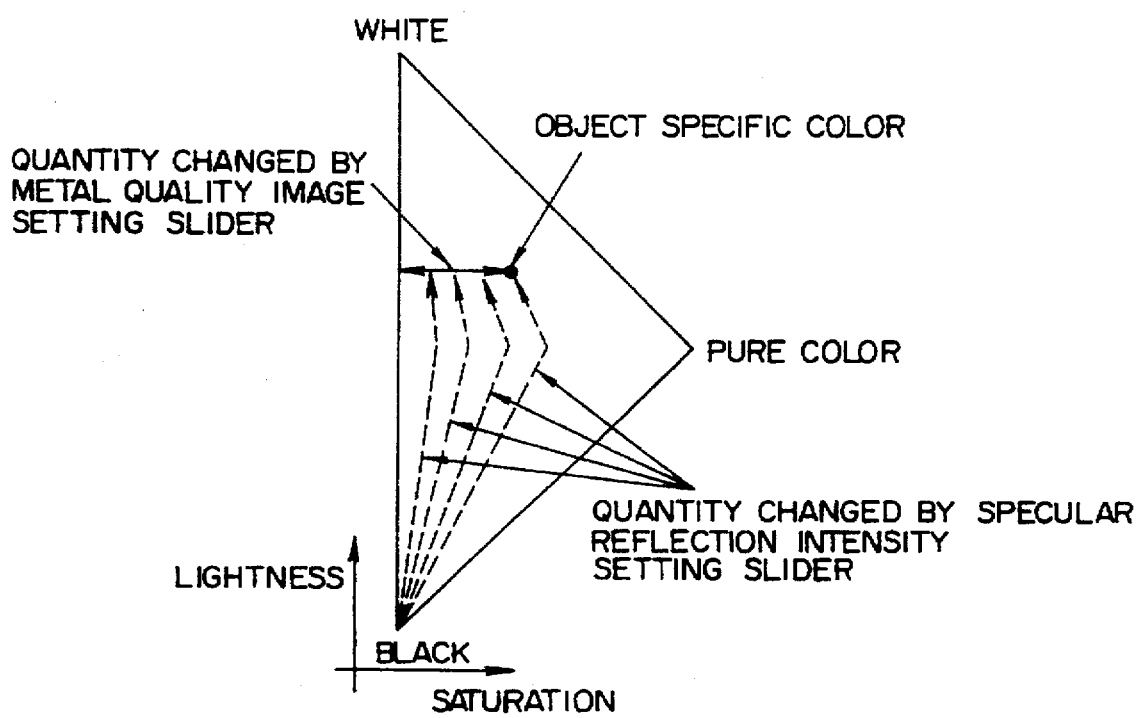

FIG. 11 shows an example of a display on the display screen 101, showing a display section serving as a user interface for setting an object specific color and surface reflection attribute. A set of three sliders for hue, lightness, and saturation is used for color representation in the ELS color model and for indication of an object specific color. The set of sliders has a function to provide a type of icon. Similarly, a set of three sliders for red, green, and blue is used for color representation in the RGB color model and for indication of an object specific color. The set of hue, lightness, and saturation sliders is related to the set of red, green, and blue sliders such that as one of the sets is changed, the other also changes while maintaining a match therebetween. An ambient light reflection intensity setting slider is used for determining the parameter Ka by changing the lightness component of an object specific color as shown in FIG. 12. FIG. 12 shows one cross section of an ELS color model. Colors on a cross section have the same hue, and the cross section includes an object specific color. As the lightness component is changed, the value of Ka continuously changes from the object specific color to black color as indicated by a bold line. A diffuse reflection intensity setting slider determines Kd by changing the lightness component of an object specific color also as shown in FIG. 12. A surface roughness setting slider is a slider for determining the range of surface reflection components. A metal material image quality adjusting slider is a slider for changing the saturation component of an object specific color as indicated by the bold line of FIG. 13. The saturation component is changed from the object specific color to an achromatic color or gray. If the slider is moved toward the Metal side, the output changes toward the object specific color, whereas if the slider is moved toward the Plastic side, it changes toward the achromatic color. A specular reflection intensity setting slider determines Ks by changing the lightness component of the color determined by the metal material image quality slider as indicated by broken lines in FIG. 13. A transmission light intensity setting slider determines Kt by changing the lightness component of an object specific color as shown in FIG. 12. A refraction coefficient setting slider is a slider for setting a refraction coefficient of a transparent object.

In FIG. 11, an object specific color setting menu is a menu used for selecting the specific color of an object. Upon selection by an operator, a specific color previously stored is called and set to each slider. A surface reflection attribute setting menu is a menu used for selecting a surface reflection attribute. Upon selection by an operator, a parameter previously stored is called and set to each slider such that Ka, Kd, Ks, Kt, surface roughness, and refraction coefficient are set to respective sliders. An operator may instruct to register the object specific color or surface reflection attribute set to sliders into the corresponding menu.

Figure 14:
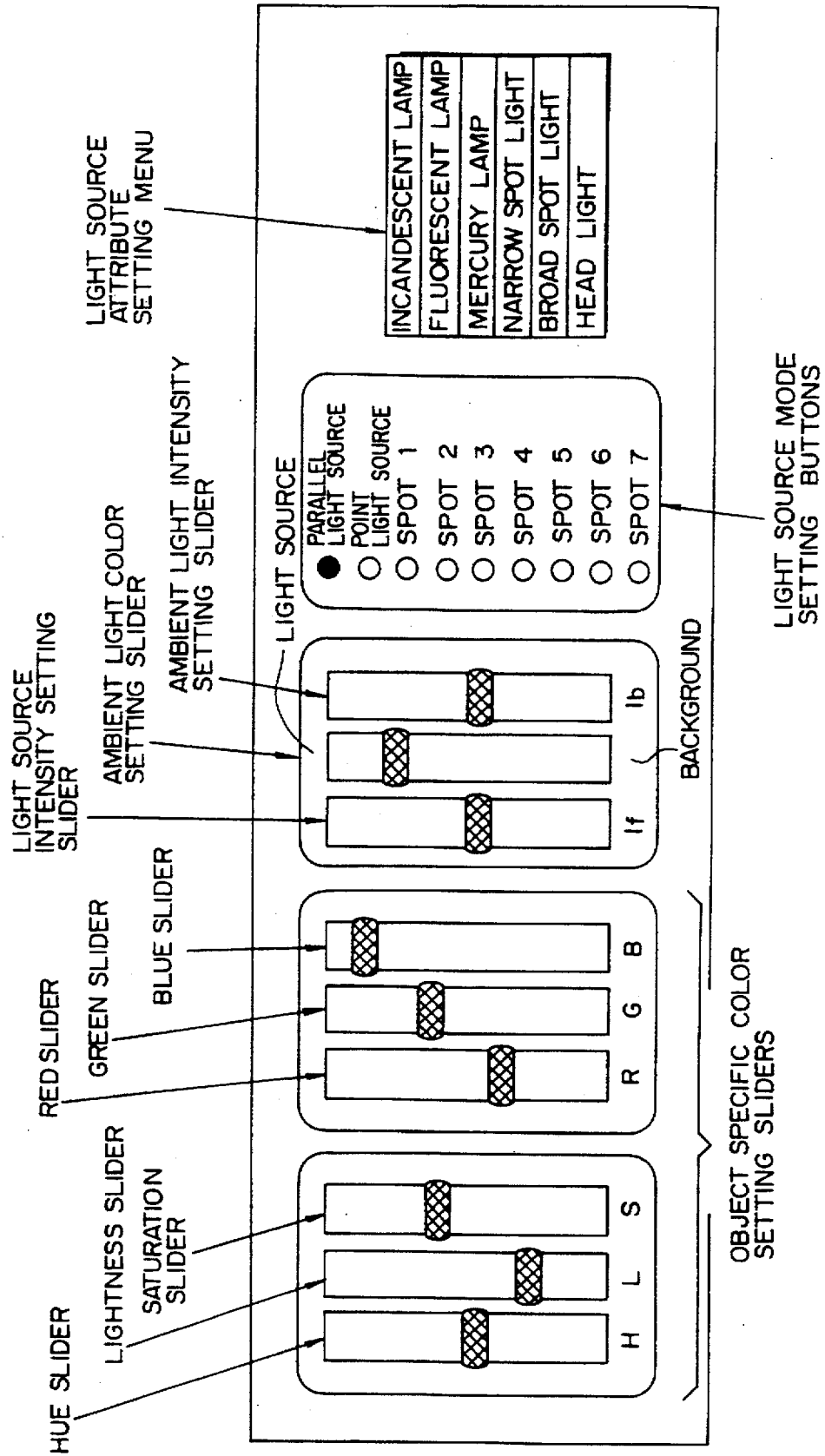
Figure 15:
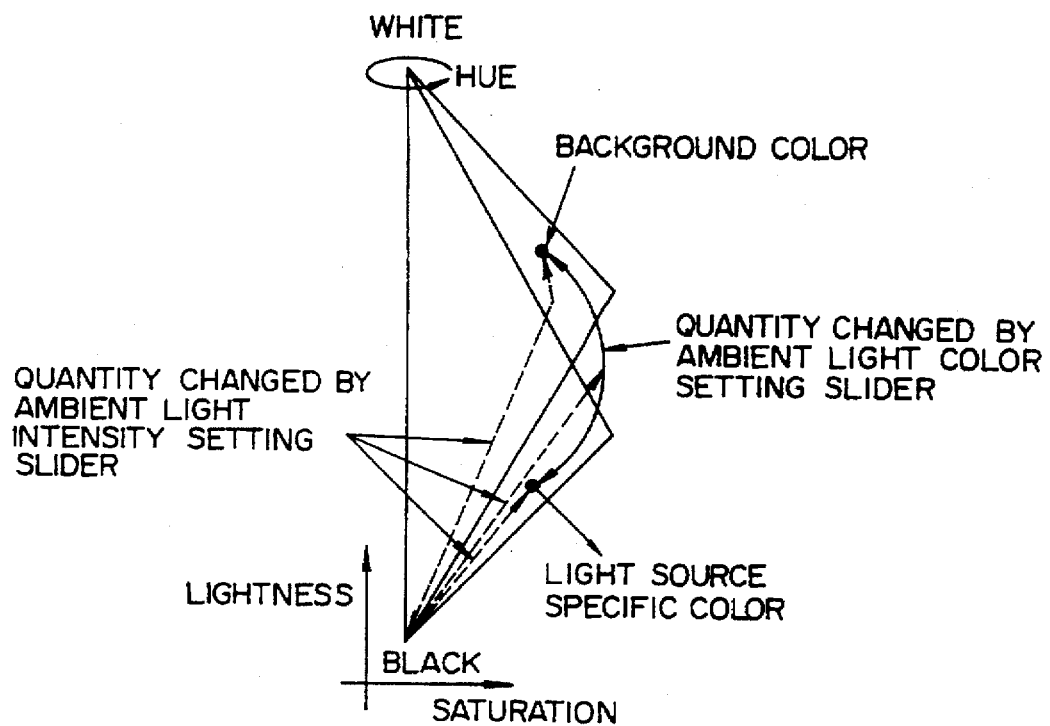

FIG. 14 shows an example of a display on the display screen 101, showing a display section serving as a user interface for setting a light source attribute. A set of three sliders for hue, lightness, and saturation is used for color representation in the HLS color model and for indication of the specific color of a light source. The set of sliders has a function to provide a type of icon. Similarly, a set of three sliders for red, green, and blue is used for color representation in the RGB color model and for indication of the specific color of a light source. The set of hue, lightness, and saturation sliders is related to the set of red, green, and blue sliders such that as one of the sets is changed, the other also changes while maintaining a match therebetween. A light source intensity slider is used for determining If by changing the lightness component of a light source specific color also as shown in FIG. 12. An ambient light color setting slider is a slider for performing interpolation between the light source specific color and a background color as shown in FIG. 15. If the slider is moved to the Background Color side, the color of the ambient light changes toward the background color, whereas if the slider is moved toward the Light Source Specific Color side, the color of the ambient light changes toward the light source specific color. An ambient light intensity setting slider determines Ib by changing the lightness component of the color determined by the ambient light color setting slider as indicated by broken lines in FIG. 15. A light source mode setting button sets a mode of a light source.

In FIG. 14, a light source attribute setting menu is a menu used for selecting a light source attribute. Upon selection by an operator, a parameter previously stored is called and set to each slider to determine Ib, If, and the type of a light source. An operator may instruct to register the light source attributes set to sliders into the menu.

Figure 16:
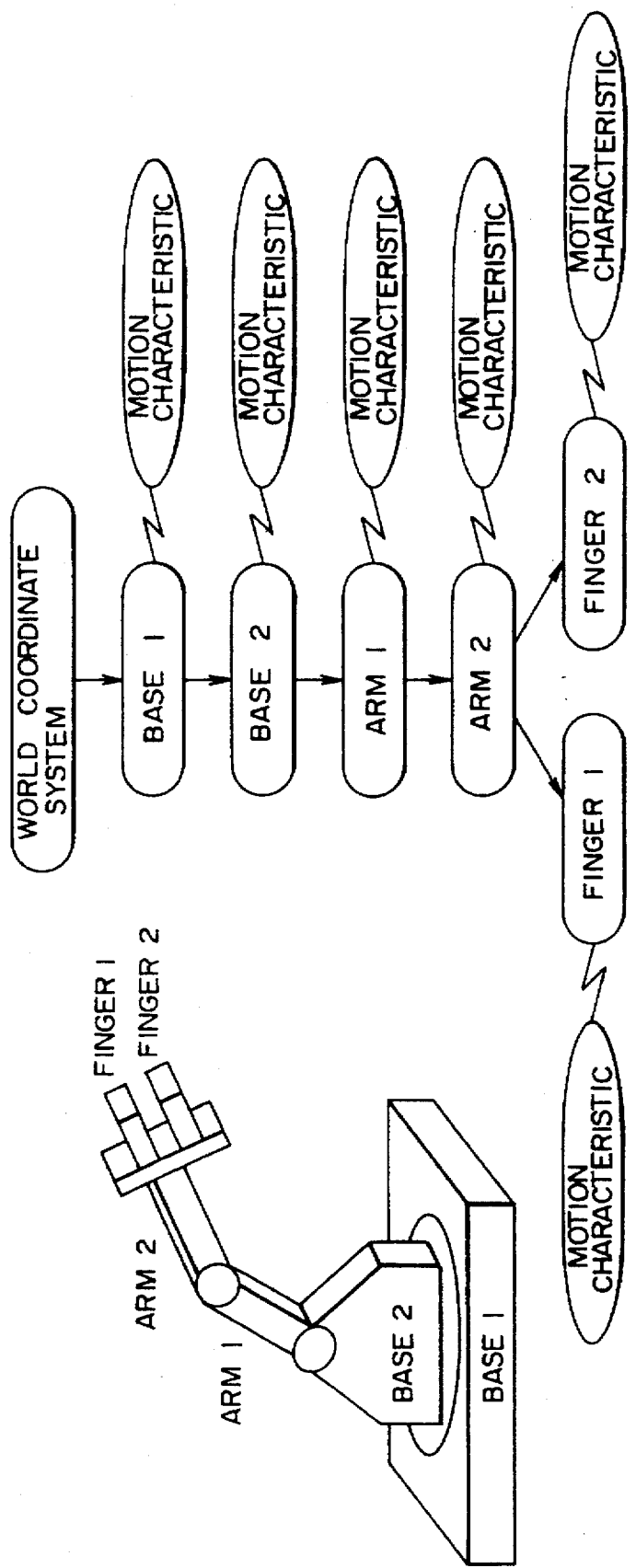

Next, a method of combining shape data and a method of designating a motion will be described using the above-described embodiment. Each shape data has its particular coordinate system. Each shape is defined using its particular coordinate system. Each shape data is called herein a component data, and the coordinate system for each shape data is called herein a component coordinate system. A hierarchic structure such as shown in FIG. 16 is set for all components of an object. The position in each component coordinate system is expressed as a position in a parent component coordinate system. A virtual component called a world is provided so that an absolute position of a component can be determined by setting a hierarchic structure between the world and components. For moving a component, there are a method of moving a component itself in its component coordinate system, and a method of moving the position of a subject component coordinate system in its parent coordinate system. The motion of an object is expressed by the latter method, i.e., by changing the position of a subject component coordinate system in its parent coordinate system.

A light source for a camera is defined not as a particular one, but as a general component having a camera attribute or light source attribute. It is therefore possible to determine the positions of a camera and light source by means of motion designation using a hierarchical structure. A camera, light source, and components are collectively called an object. A camera and light source have a camera coordinate system and light source coordinate system, respectively, similar to components. These coordinate systems and component systems are collectively called an object coordinate system.

In this embodiment, the motion of an object is always expressed as a motion of the object coordinate system of the object in the object coordinate system of the parent object. The motion of an object is processed by dividing it into a position change and rotation of the object.

Figure 17:
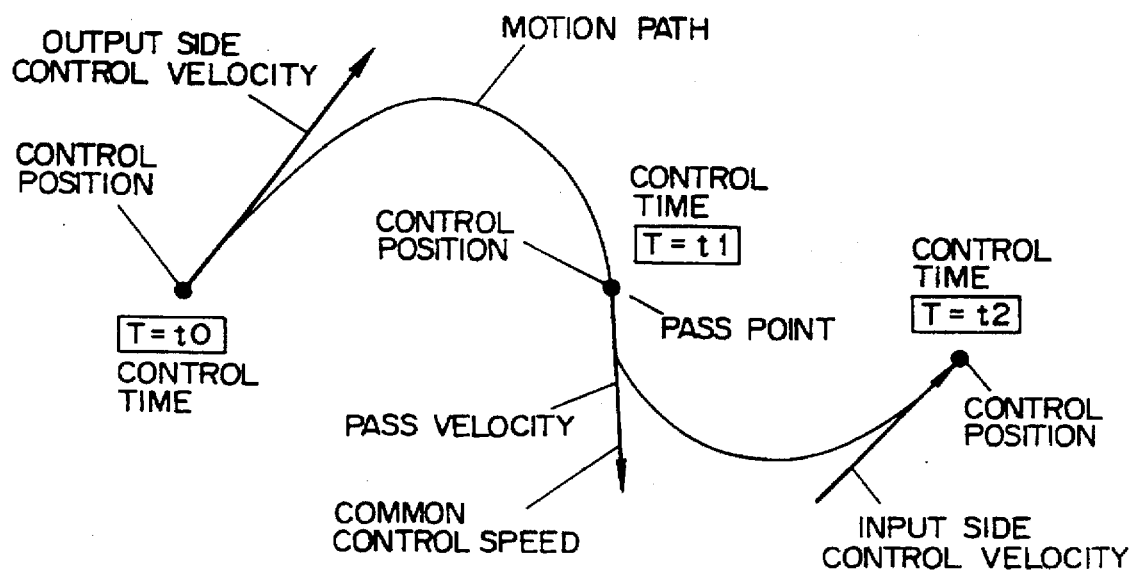

As illustrated by a display example on the display unit 101 shown in FIG. 17, the position change is established by designating a pass position of an object at a certain time, or by designating a pass position and the magnitude and direction of a velocity at a certain time. Such designations are performed a plurality of times, and interpolation is carried out between respective designated points serving as start and end points, thereby obtaining the whole locus and velocity change. In the following, the interpolation method will be described in detail.

(1) Position and velocity information is given for both the start and end points.

The positions of the start and end points of an object relative to the origin of the object coordinate system are given by (Pxs, Pys, Pzs) and (Pxe, Pye, Pze) respectively in the parent object coordinate system, and the velocities at the start and end points are given by (Vxs, Vys, Vzs) and (Vxe, Vye, Vze) respectively in the parent object coordinate system. The locus can be expressed using the X, Y and Z axes given by a third order parameter representation of t. Assuming that the locus changes from the start point position at time t=0 to the end point position at time t=1, then interpolation equations are:

$$X=(2*Pxs-2*Pxe+Vxs+Vxe)*t^3+(-3*Pxs+3*Pxe-2*Vxs-Vxe)*t^2+Vxs*t+Pxs$$

$$Y=(2*Pys-2*Pye+Vys+Vye)*t^3+(-3*Pys+3*Pye-2*Vys-Vye)*t^2+Vys*t+Pys$$

$$Z=(2*Pzs-2*Pze+Vzs+Vze)*t^3+(-3*Pzs+3*Pze-2*Vzs-Vze)*t^2+Vzs*t+Pzs \quad (8)$$

(2) Position and velocity information is given for the start point, and position information is given for the end point.

The positions of the start and end points of an object relative to the origin of the object coordinate system are given by (Pxs, Pys, Pzs) and (Pxe, Pye, Pze) respectively in the parent object coordinate system, and the velocity at the start point is given by (Vxs, Vys, Vzs) in the parent object coordinate system. The locus can be expressed using the X, Y and Z axes given by a second order parameter representation of t. Assuming that the locus changes from the start point position at time t=0 to the end point position at time t=1, then interpolation equations are:

$$X=(-Pxs+Pxe-Vxs)*t^2+Vxs*t+Pxs$$

$$Y=(-Pys+Pye-Vys)*t^2+Vys*t+Pys$$

$$Z=(-Pzs+Pze-Vzs)*t^2+Vzs*t+Pzs \quad (9)$$

(3) Position information is given for the start point, and position and velocity information is given for the end point.

The positions of the start and end points of an object relative to the origin of the object coordinate system are given by (Pxs, Pys, Pzs) and (Pxe, Pye, Pze) respectively in the parent object coordinate system, and the velocity at the end point is given by (Vxe, vye, vze) in the parent object coordinate system. The locus can be expressed using the X, Y and Z axes given by a second order parameter representation of t. Assuming that the locus changes from the start point position at time t=0 to the end point position at time t=1, then interpolation equations are:

$$X=(Pxs-Pxe+Vxs)*t^2+(-2*Pxs+2*Pxe-Vxe)*t+Pxs$$

$$Y=(Pys-Pye+Vys)*t^2+(-2*Pys+2*Pye-Vye)*t+Pys$$

$$Z=(Pzs-Pze+Vzs)*t^2+(-2*Pzs+2*Pze-Vze)*t+Pzs \quad (10)$$

(4) Position and velocity information is given for the start point, and velocity information is given for the end point.

The position of the start point of an object relative to the origin of the object coordinate system is given by (Pxs, Pys, Pzs) in the parent object coordinate system, and the velocities at the start and end points are given by (Vxs, Vys, Vzs)

and (Vxe, Vye, Vze) respectively in the parent object coordinate system. The locus can be expressed using the X, Y and Z axes given by a second order parameter representation of t. Assuming that the locus changes from the start point position at time t=0 to the end point position at time t=1, then interpolation equations are:

$$X=(-Vxs+Vxe)/2*t^2+Vxs*t+Pxs$$

$$Y=(-Vys+Vye)/2*t^2+Vys*t+Pys$$

$$Z=(-Vzs+Vze)/2*t^2+Vzs*t+Pzs \qquad (11)$$

(5) Velocity information is given to the start point, and position and velocity information is given to the end point.

The position of the end point of an object relative to the origin of the object coordinate system is given by (Pxe, Pye, Pze) in the parent object coordinate system, and the velocities at the start and end points are given by (Vxs, Vys, Vzs) and (Vxe, Vye, Vze) respectively in the parent object coordinate system. The locus can be expressed using the X, Y and Z axes given by a second order parameter representation of t. Assuming that the locus changes from the start point position at time t=0 to the end point position at time t=1, then interpolation equations are:

$$X=(-Vxs+Vxe)/2*t^2+Vxs*t+Pxe-(Vxs+Vxe)/2$$

$$Y=(-Vys+Vye)/2*t^2+Vys*t+Pye-(Vys+Vye)/2$$

$$Z=(-Vzs+Vze)/2*t2+Vzs*t+Pze-(Vzs+Vze)/2 \qquad (12)$$

(6) Position and velocity information is given for the start point.

The position of the start point of an object relative to the origin of the object coordinate system is given by (Pxs, Pys, Pzs) in the parent object coordinate system, and the velocity at the start point is given by (Vxs, Vys, Vzs) in the parent object coordinate system. The locus can be expressed using the X, Y and Z axes given by a first order parameter representation of t. Assuming that the locus changes from the start point position at time t=0 to the end point position at time t=1, then interpolation equations are:

$$X=Vxs*t+Pxs$$

$$Y=Vys*t+Pys$$

$$Z=Vzs*t+Pzs \qquad (13)$$

(7) Position and velocity information is given for the end point.

The position of the end point of an object relative to the origin of the object coordinate system is given by (Pxe, Pye, Pze) in the parent object coordinate system, and the velocity at the end point is given by (Vxe, Vye, Vze) in the parent object coordinate system. The locus can be expressed using the X, Y and Z axes given by a first order parameter representation of t. Assuming that the locus changes from the start point position at time t=0 to the end point position at time t=1, then interpolation equations are:

$$X=Vxe*t+(Pxe-Vxe)$$

$$Y=Vye*t+(Pye-Vye)$$

$$Z=Vze*t+(Pze-Vze) \qquad (14)$$

(8) Position information is given for both the start and end points.

The positions of the start and end points of an object relative to the origin of the object coordinate system are given by (Pxs, Pys, Pzs) and (Pxe, Pye, Pze) respectively in the parent object coordinate system. The locus can be expressed using the X, Y and Z axes given by a first order parameter representation of t. Assuming that the locus changes from the start point position at time t=0 to the end point position at time t=1, then interpolation equations are:

$$X=(-Pxs+Pxe)*t+Pxs$$

$$Y=(-Pys+Pye)*t+Pys$$

$$Z=(-Pzs+Pze)*t+Pzs \qquad (15)$$

(9) Position information is given for the start point, and velocity information is given for the end point.

The position of the start point of an object relative to the origin of the object coordinate system is given by (Pxs, Pys, Pzs) in the parent object coordinate system, and the velocity at the end point is given by (Vxe, Vye, Vze) in the parent object coordinate system. The locus can be expressed using the X, Y and Z axes given by a first Order parameter representation of t. Assuming that the locus changes from the start point position at time t=0 to the end point position at time t=1, then interpolation equations are:

$$X=Vxe*t+Pxs$$

$$Y=Vye*t+Pys$$

$$Z=Vze*t+Pzs \qquad (16)$$

(10) Velocity information is given for the start point, and position information is given for the end point.

The position of the end point of an object relative to the origin of the object coordinate system is given by (Pxe, Pye, Pze) in the parent object coordinate system, and the velocity at the start point is given by (Vxs, Vys, Vzs) in the parent object coordinate system. The locus can be expressed using the X, Y and Z axes given by a first order parameter representation of t. Assuming that the locus changes from the start point position at time t=0 to the end point position at time t=1, then interpolation equations are:

$$X=Vxs*t+(Pxe-Vxs)$$

$$Y=Vys*t+(Pye-Vys)$$

$$Z=Vze*t+(Pze-Vzs) \qquad (17)$$

(11) Position information is given for the start point, or position information is given for the end point.

The positions of the start and end points of an object relative to the origin of the object coordinate system do not change in the parent object coordinate system. Namely, the positions do not move.

(12) Velocity information is given for both the start and end points, velocity information is given for the start point, or velocity information is given for the end point.

In this case, interpolation equations cannot be obtained, so such a designation is considered as a fault.

In practical use, a desired motion is set by consecutively coupling the above-described interpolation equations. In coupling interpolation equations, the end point coordinate obtained by a set of interpolation equations must be the same as the start point coordinate obtained by the next set of interpolation equations. In other words, the start point coordinate obtained by a set of interpolation equations must be always the same as the end point coordinate obtained by the preceding set of interpolation equations to be coupled to the former set.

Next, a user interface for setting a motion will be described. In this embodiment, a motion path such as shown in FIG. 17 is displayed on the screen of the display means 101. In this embodiment, a motion path of an object is established by setting the position and velocity of an object at each control time. The established path is called a motion path. The control time means a proper time set by an operator. A user interface for changing the control time will be later described. The position of an object at a control time, which position can be set by an operator, is called a control position. The velocity of an object immediately before a control time is called an input side control velocity. The velocity of an object immediately after a control time is called an output side control velocity. Where the same velocity is used as the input and output side control velocities is called a common control velocity.

A proper mode is selectively set for inputting a control position, input side control velocity, output side control velocity, common control velocity, or a combination thereof, at each control time. Which mode is being set at each control time, i.e., which input among the control position, input side control velocity, output side control velocity, and common control velocity is being permitted, may be identified by discriminately displaying a black circle, an arrow, or a particular color on the screen which displays a motion path.

For defining a motion path by coupling a plurality of interpolation equations described above at a plurality of preset control times, a single representative control time is set. It is always necessary to set a control position at the representative control time. In obtaining a motion path after the representative control time, the end point coordinate obtained by interpolation equations of one interpolation section before the object interpolation section should be always made the same as the start point coordinate obtained by interpolation equations for the object interpolation section. In other words, interpolation calculation progresses toward the future time. Therefore, the mode for such interpolation among the above-described modes is only the mode which allows to enter the position of an object at the start point. In obtaining a motion path before the representative control time, the start point coordinate obtained by interpolation equations of one interpolation section after the object interpolation section should be always made the same as the end point coordinate obtained by interpolation equations for the object interpolation section. In other words, interpolation calculation progresses toward the past time. Therefore, the mode for such interpolation among the above described modes is only the mode which allows to enter the position of an object at the end point. If the input side control velocity is set at the first control time, the interpolation Equations (13) described above can be used for the time period before the control time. Similarly, if the output side control velocity is set at the last control time, the interpolation Equations (12) described above can be used for the time period after the control time.

Figure 18A:
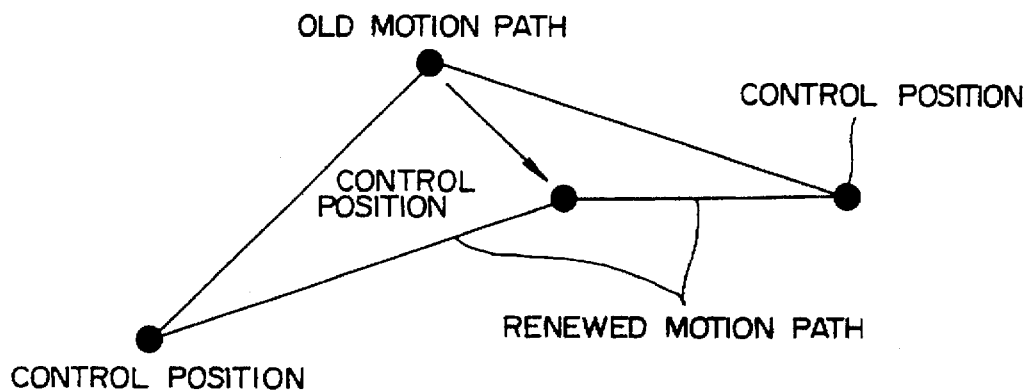
Figure 18B:
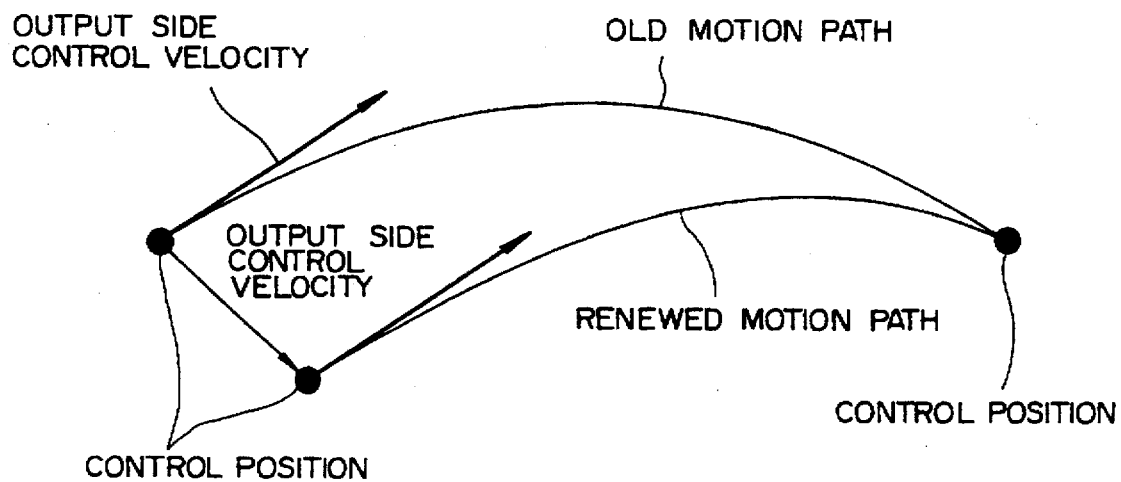

A method of setting a control position will be described with reference to FIGS. 18a–18b. FIGS. 18 to 23 show examples of displays on a CRT display 101 serving as the display means. If the mode at a certain control time is a mode allowing an input of a control position, such a mode may be informed by using, for example, a large black circle at the control position or a particular color. An operator (not shown) can move the black circle indicating the control position by using input means such as a position indicator or the like. A motion path will change as the control position moves, and the resultant motion path is displayed immediately.

Figure 19A:
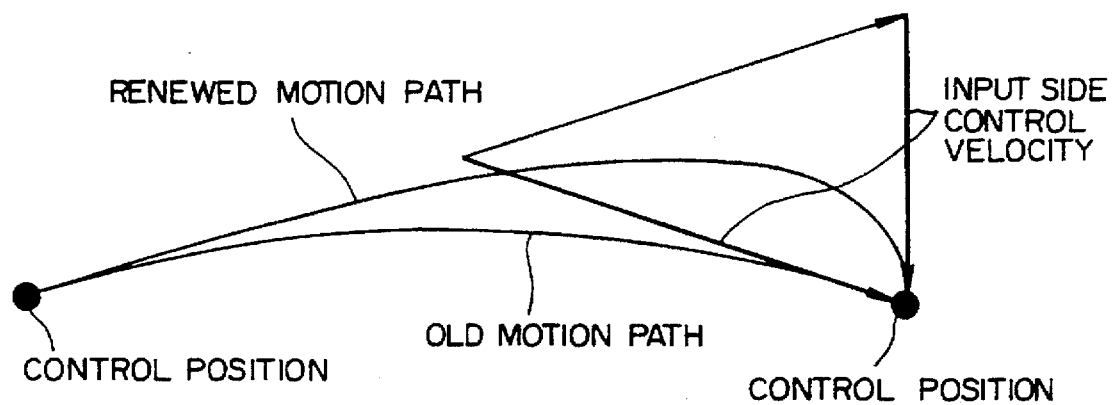
Figure 19B:
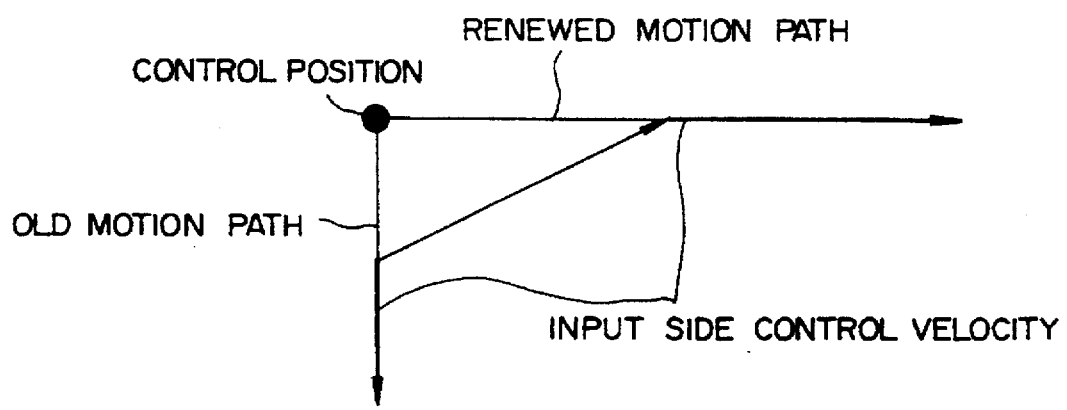

A method of setting an input side control velocity will be described with reference to FIGS. 19a–19b. If an input of an input side control velocity is allowed, an operator is informed of such an effect by using, for example, an arrow representative of the input side control velocity or a particular color. An operator moves the tail of the vector representing the input side control velocity to set a desired input side control velocity. A motion path will change as the input side control velocity is set, and the resultant motion path is displayed immediately. However, in the case where the control time for setting the input side control velocity is after the representative control time and the mode is a mode which does not require the control position, the updated motion path is displayed after the input side control velocity is set, because the position of the object at the control time moves if the input side control velocity is changed.

Figure 20A:
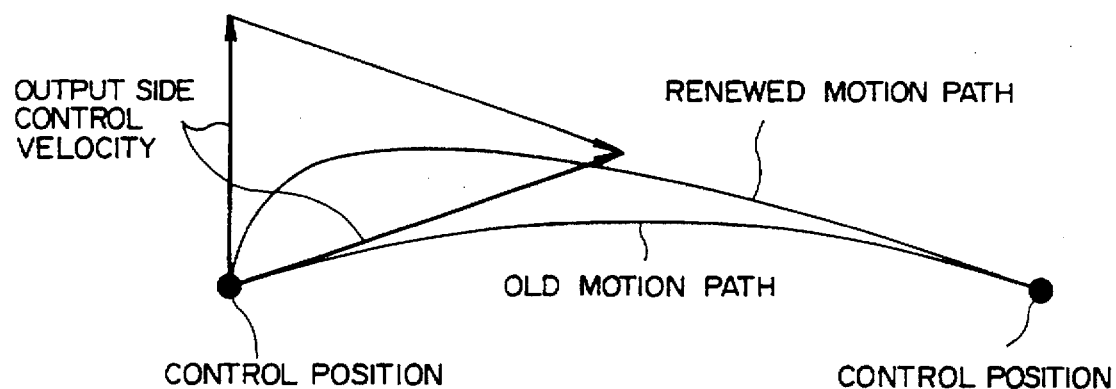
Figure 20B:
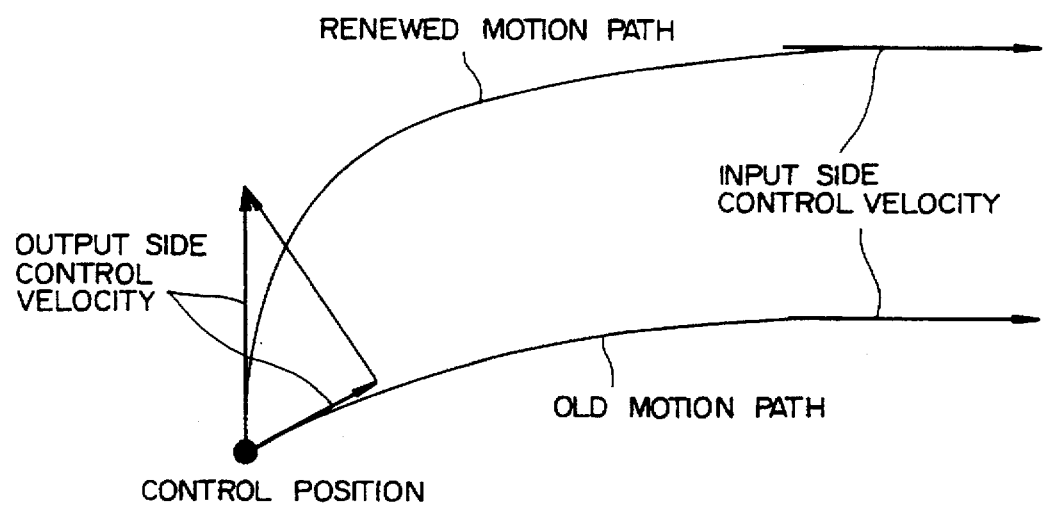
Figure 21A:
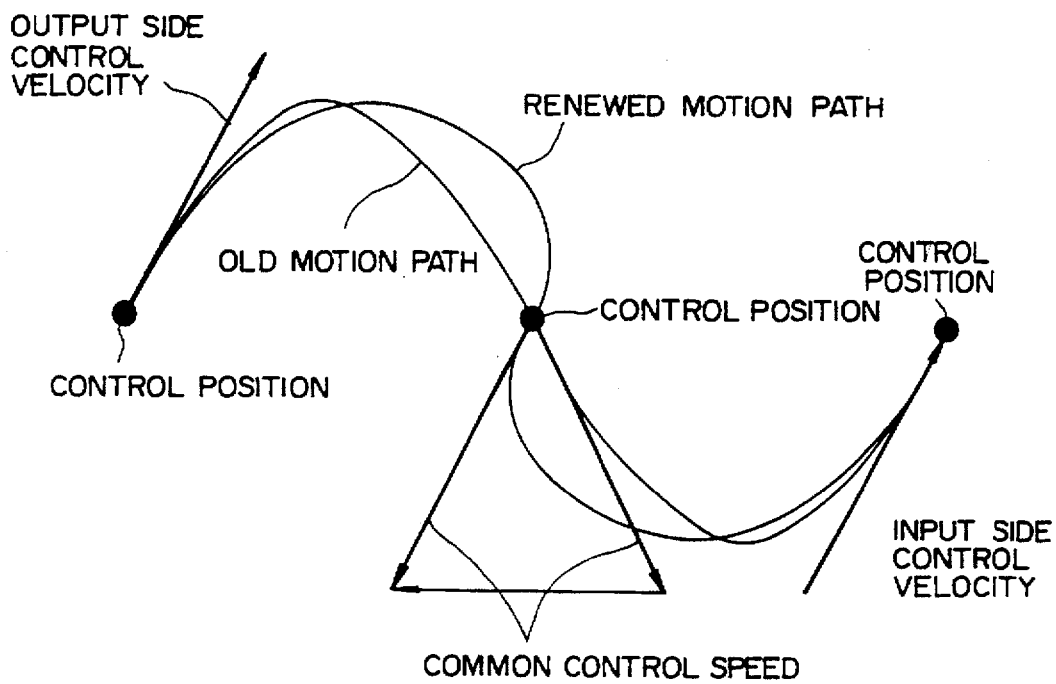
Figure 21B:
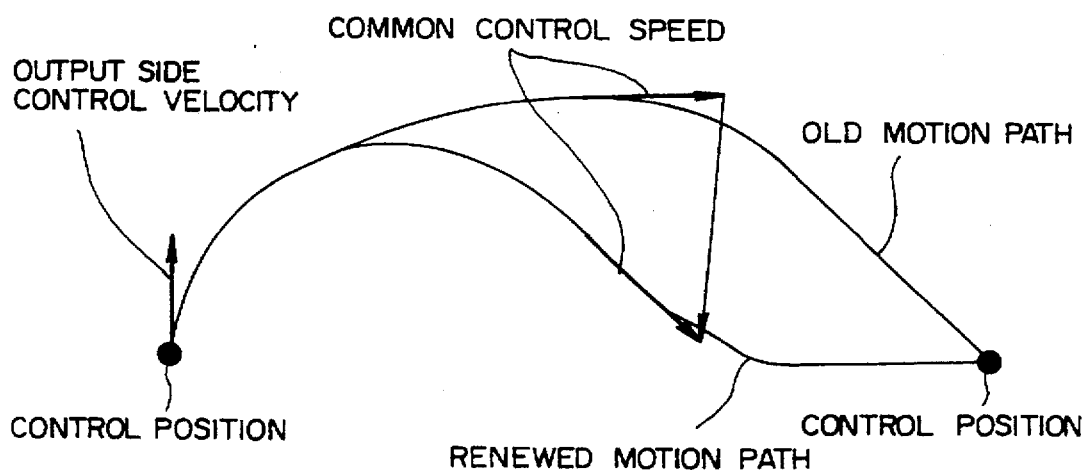

A method of setting an output side control velocity will be described with reference to FIGS. 20a–20b. If an input of an output side control velocity is allowed, an operator is informed of such an effect by using, for example, an arrow representative of the output side control velocity or a particular color. An operator moves the head of the vector representing the output side control velocity to set a desired output side control velocity. A motion path will change as the output side control velocity is set, and the resultant motion path is displayed immediately. However, in the case where the control time for setting the output side control velocity is before the representative control time and the mode is a mode which does not require the control position, the updated motion path is displayed after the output side control velocity is set, because the position of the object at the control time moves if the output side control velocity is changed.

If a common control velocity is set, the object moves smoothly because there is no change in motion velocity before and after the control time. A method of setting a common control velocity will be described with reference to FIGS. 21a–21b. If an input of a common control velocity is allowed, an operator is informed of such an effect by using, for example, an arrow representative of the common control velocity or a particular color. An operator moves the head of the vector representing the common control velocity to set a desired common control velocity. A motion path will change as the common control velocity is set, and the resultant motion path is displayed immediately. However, in the case where the mode for the control time for setting the common control velocity is a mode which does not require the control position, the updated motion path is displayed after the common control velocity is set, because the position of the object at the control time moves if the common control velocity is changed.

An interpolation mode for interpolating a section between adjacent control times is determined in accordance with whether an output side control velocity and/or control position is given to the start point or whether an input side control velocity and/or control position is given to the end point. Even if a control position is not given for a control time after the representative control time, there is used an interpolation mode the same as that when a control position is given to the start point. The reason for this is that the control position at the end point of the preceding interpolation section is used as the control position at the start point of the interpolation section in concern. Similarly, even if a control position is not given for a control time before the representative control time, there is used an interpolation mode the same as that when a control position is given to the end point. The reason for this is that the control position at the start point of the succeeding interpolation section is used as the control position at the end point of the interpolation section in concern. In view of the above, although the following description is directed to the case where a control position for a control time after the representative control time is not given to the start point, quite the same description is applicable to the case where a control position is given to the start point. Similarly, although the following description is directed to the case where a control position for a control time before the representative control time is not given to the end point, quite the same description is applicable to the case where a control position is given to the end point.

First, the description will be given for each interpolation section after the representative control time. If an output side control velocity is given to the start point, and a control position and input side control velocity are given to the end point, then there are used the interpolation Equations (8) described in section (1). If an output side control velocity is given to the start point, and a control position is given to the end point, then there are used the interpolation Equations (9) described in section (2). If no information is given to the start point, and a control position and input side control velocity are given to the end point, then there are used the interpolation Equations (10) described in section (3). If an output side control velocity is given to the start point, and an input side control velocity is given to the end point, then there are used the interpolation Equations (11) described in section (4). If an output side control velocity is given to the start point, and no information is given to the end point, then there are used the interpolation Equations (13) described in section (6). If no information is given to the start point, and a control position is given to the end point, then there are used the interpolation Equations (15) described in section (8). If no information is given to the start point, and an input side control velocity is given to the end point, then there are used the interpolation Equations (16) described in section (9). If no information is given to both the start and end points, then there are used the interpolation equations described in section (11).

Next, the description will be given for each interpolation section before the representative control time. If a control position and output side control velocity are given to the start point, and an input side control velocity is given to the end point, then there are used the interpolation Equations (8) described in section (1). If a control position is given to the start point, and an input side control velocity is given to the end point, then there are used the interpolation Equations (10) described in section (3). If a control position and output side control velocity are given to the start point, and no information is given to the end point, then there are used the interpolation Equations (9) described in section (2). If an output side control velocity is given to the start point, and an input side control velocity is given to the end point, then there are used the interpolation Equations (12) described in section (5). If no information is given to the start point, and an input side control velocity is given to the end point, then there are used the interpolation Equations (14) described in section (7). If a control position is given to the start point, and no information is given to the end point, then there are used the interpolation Equations (15) described in section (8). If an output side control velocity is given to the start point, and no information is given to the end point, then there are used the interpolation Equations (17) described in section (10). If no information is given to both the start and end points, then there are used the interpolation equations described in section (11).

Furthermore, if an input side control velocity is given for the first control time, the interpolation Equations (14) described in section (7) are used for an interpolation section before the first control time. If an output side control velocity is given for the last control time, the interpolation Equations (13) described in section (6) are used for an interpolation section after the last control time. If there is only one control time and both the input and output side control velocities are not given to the control time, there are used the interpolation equations described in section (11).

Figure 22:
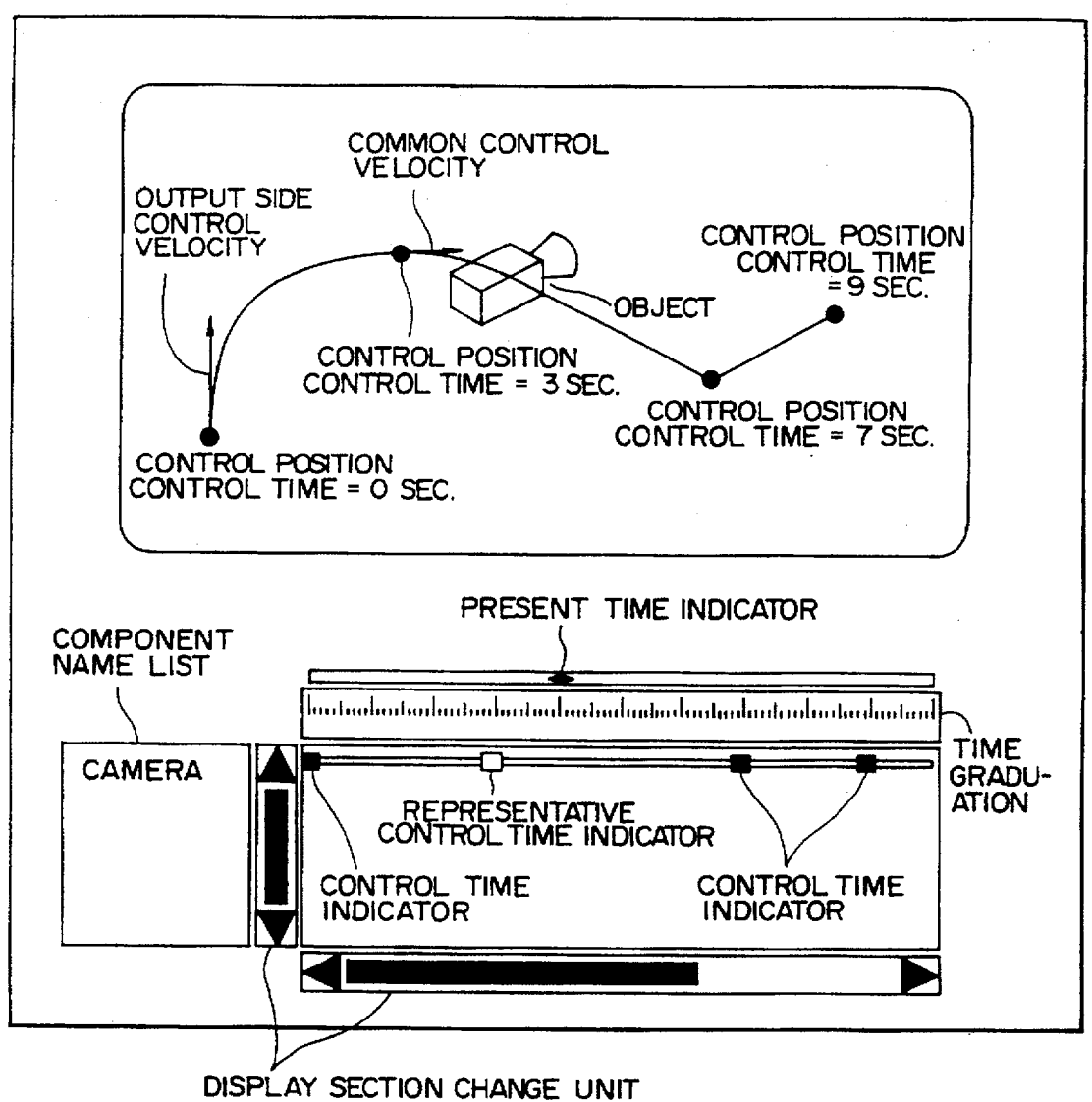

FIG. 22 shows a time line editor for editing a control time. Rectangles on a line at the right of a component name of an object are control time indicators for indicating the points of control times, and a representative control time indicator for indicating the point of a representative control time. These indicators have the functions of icons. Specifically, in the case of FIG. 22, for an object having a name "camera", control times are set at 0 sec, 3 sec, 7 sec, and 9 sec. A representative control time is set as 3 sec. A control position and output side control velocity are given for the control time 0 sec. A control position and common mode input and output side velocity are given for the control time 3 sec. Only a control position is given for the control times 7 and 9 sec.

A present time indicator is used for indicating a time when an object is displayed on a motion path. As the present time indicator is moved by using a position indicator or the like, the displayed object moves on the motion path.

If the control time indicator or representative control time indicator is moved right and left by using a position indicator, the corresponding control time can be changed. As a control time is set, the motion path will change and the resultant motion path is displayed immediately. For example, as shown in FIG. 23, if a control time is changed from 6 sec to 7.5 sec using an icon, the displayed locus at the upper portion of the frame will also change.

It is possible to determine whether information is to be set for a control time indicated by a control time indicator or representative control time indicator selected by an input means such as a position indicator. Namely, it is possible to determine whether a control position, input side control velocity, or output side control velocity is to be set for a certain control time.

Figure 23:
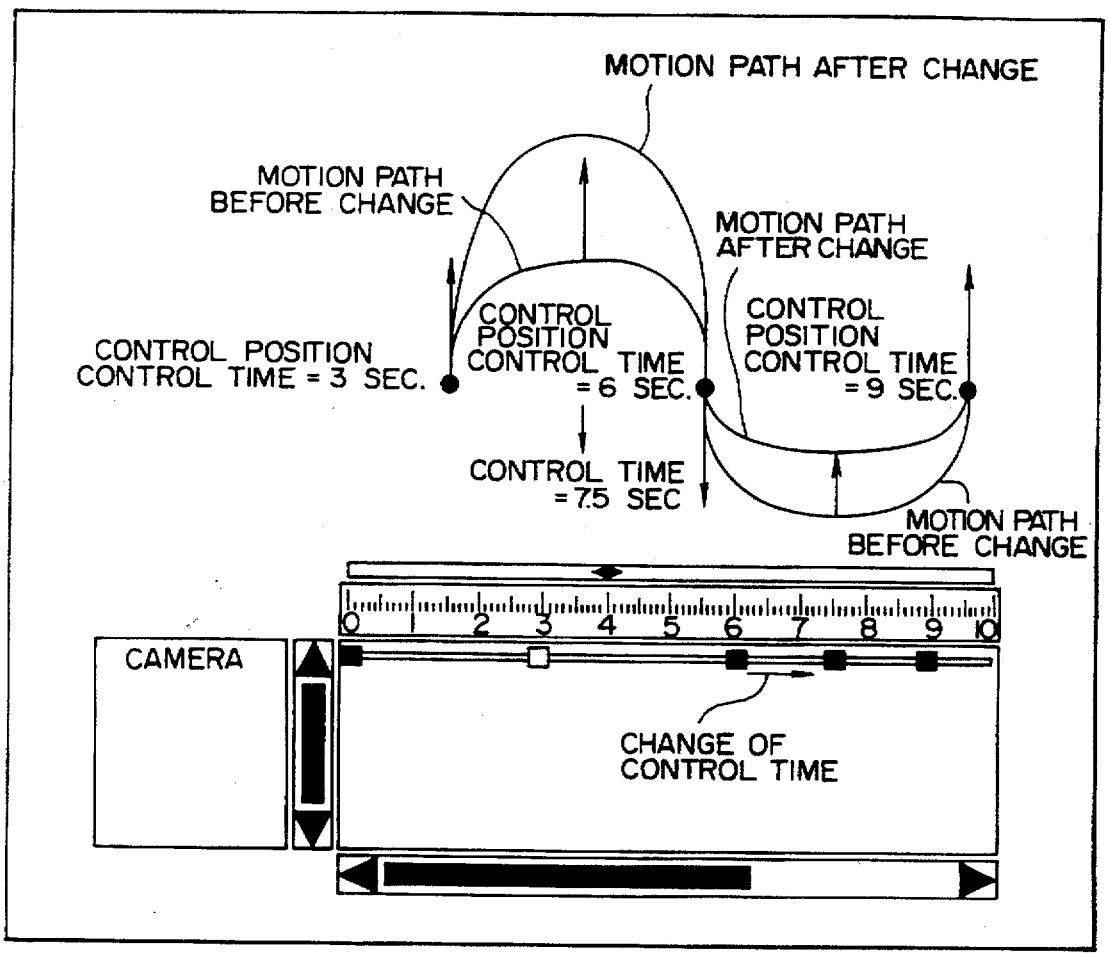

In time line editors shown in FIGS. 22 and 23, a new control time can be set on a line at the right side of a component name, by using a position indicator. A control time indicated by a control time indicator may be erased by selecting its rectangle.

Next, a method of rotating an object will be described. As described previously, the rotation of an object, i.e., the facing direction of an object, is expressed as a rotation of the object in the object coordinate system about the origin of an object coordinate system of a parent object. In this embodiment, a rotary axis is referenced to the coordinate system of a parent object. A rotary axis may be referenced to the coordinate system of the object itself.

Figure 24:
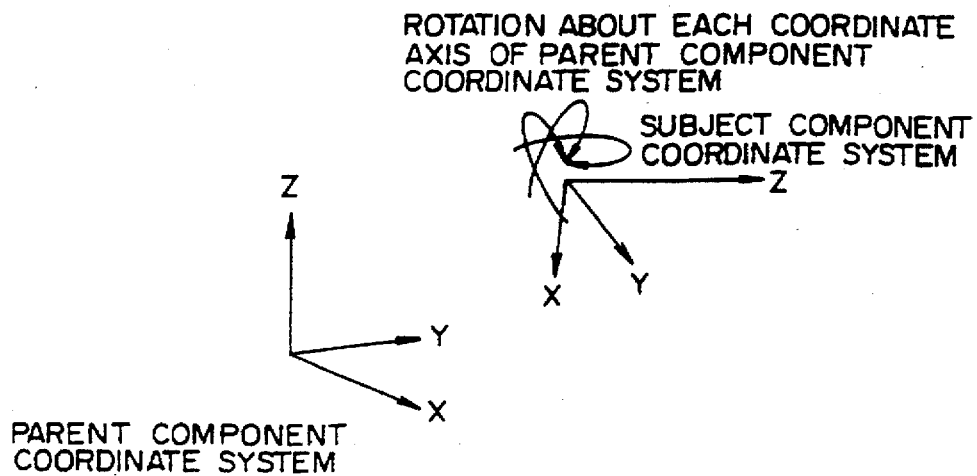

As shown in FIG. 24, a rotation of an object is designated by a rotary angle and angular velocity with respect to the X, Y, and Z axes of a parent object. Such designations are performed a plurality of times, and interpolation is carried out between respective designated points serving as start and end points, thereby obtaining the whole rotary angles and angular velocities. In the following, the interpolation method will be described in detail.

(1) A rotary angle and angular velocity are given to both the start and end points.

The rotary angles of the start and end points of an object in the object coordinate system are given by (Rxs, Rys, Rzs) and (Rxe, Rye, Rze) respectively in the parent object coordinate system, and the angular velocities at the start and end points are given by (Wxs, Wys, Wzs) and (Wxe, Wye, Wze) respectively in the parent object coordinate system. The rotary angle can be expressed using the X, Y and Z axes given by a t-parameter representation. Assuming that the rotary angle changes from the start point position at time t=0 to the end point position at time t=1, then interpolation equations are:

$$RX=(2*Rxs-2*Rxe+Wxs+Wxe)*t^3+(-3*Rxs+3*Rxe-2*Wxs-Wxe)*t^2+Wxs*t+Rxs$$

$$RY=(2*Rys-2*Rye+Wys+Wye)*t^3+(-3*Rys+3*Rye-2*Wys-Wye)*t^2+Wys*t+Rys$$

$$RZ=(2*Rzs-2*Rze+Wzs+Wze)*t^3+(-3*Rzs+3*Rze-2*Wzs-Wze)*t^2+Wzs*t+Rzs \quad (18)$$

(2) A rotary angle and angular velocity are given to the start point, and a rotary angle is given to the end point.

The rotary angles of the start and end points of an object in the object coordinate system are given by (Rxs, Rys, Rzs) and (Rxe, Rye, Rze) respectively in the parent object coordinate system, and the angular velocity at the start point is given by (Wxs, Wys, Wzs) in the parent object coordinate system. The rotary angle can be expressed using the X, Y and Z axes given by a t-parameter representation. Assuming that the rotary angle changes from the start point position at time t=0 to the end point position at time t=1, then interpolation equations are:

$$RX=(-Rxs+Rxe-Wxs)*t^2+Wxs*t+Rxs$$

$$RY=(-Rys+Rye-Wys)*t^2+Wys*t+Rys$$

$$RZ=(-Rzs+Rze-Wzs)*t^2+Wzs*t+Rzs \quad (19)$$

(3) A rotary angle is given to the start point, and a rotary angle and angular velocity are given to the end point.

The rotary angles of the start and end points of an object in the object coordinate system are given by (Rxs, Rys, Rzs) and (Rxe, Rye, Rze) respectively in the parent object coordinate system, and the angular velocity at the end point is given by (Wxe, Wye, Wze) in the parent object coordinate system. The rotary angle can be expressed using the X, Y and Z axes given by a t-parameter representation. Assuming that the rotary angle changes from the start point position at time t=0 to the end point position at time t=1, then interpolation equations are:

$$RX=(Rxs-Rxe+Wxs)*t^2+(-2*Rxs+2*Rxe-Wxe)*t+Rxs$$

$$RY=(Rys-Rye+Wys)*t^2+(-2*Rys+2*Rye-Wye)*t+Rys$$

$$RZ=(Rzs-Rze+Wzs)*t^2+(-2*Rzs+2*Rze-Wze)*t+Rzs \quad (20)$$

(4) A rotary angle and angular velocity are given to the start point, and an angular velocity is given to the end point.

The rotary angle of the start point of an object in the object coordinate system is given by (Rxs, Rys, Rzs) in the parent object coordinate system, and the angular velocities at the start and end points are given by (wxs, wys, Wzs) and (Wxe, Wye, Wze) respectively in the parent object coordinate system. The rotary angle can be expressed using the X, Y and Z axes given by a t-parameter representation. Assuming that the rotary angle changes from the start point position at time t=0 to the end point position at time t=1, then interpolation equations are:

$$RX=(-Wxs+Wxe)/2*t^2+Wxs*t+Rxs$$

$$RY=(-Wys+Wye)/2*t^2+Wys*t+Rys$$

$$RZ=(-Wzs+Wze)/2*t^2+Wzs*t+Rzs \quad (21)$$

(5) An angular velocity is given to the start point, and a rotary angle and angular velocity are given to the end point.

The rotary angle of the end point of an object in the object coordinate system is given by (Rxe, Rye, Rze) in the parent object coordinate system, and the angular velocities at the start and end points are given by (Wxs, Wys, Wzs) and (Wxe, Wye, Wze) respectively in the parent object coordinate system. The rotary angle can be expressed using the X, Y and Z axes given by a t-parameter representation. Assuming that the rotary angle changes from the start point position at time t=0 to the end point position at time t=1, then interpolation equations are:

$$RX=(-Wxs+Wxe)/2*t^2+Wxs*t+Rxe-(Wxs+Wxe)/2$$

$$RY=(-Wys+Wye)/2*t^2+Wys*t+Rye-(Wys+Wye)/2$$

$$RZ=(-Wzs+Wze)/2*t^2+Wzs*t+Rze-(Wzs+Wze)/2 \quad (22)$$

(6) A rotary angle and angular velocity are given to the start point.

The rotary angle of the start point of an object in the object coordinate system is given by (Rxs, Rys, Rzs) in the parent object coordinate system, and the angular velocity at the start point is given by (Wxs, Wys, Wzs) in the parent object coordinate system. The rotary angle can be expressed using the X, Y and Z axes given by a t-parameter representation. Assuming that the rotary angle changes from the start point position at time t=0 to the end point position at time t=1, then interpolation equations are:

$$RX=Wxs*t+Rxs$$

$$RY=Wys*t+Rys$$

$$RZ=Wzs*t+Rzs \quad (23)$$

(7) A rotary angle and angular velocity are given to the end point.

The rotary angle of the end point of an object in the object coordinate system is given by (Rxe, Rye, Rze) in the parent object coordinate system, and the angular velocity at the end point is given by (Wxe, Wye, Wze) in the parent object coordinate system. The rotary angle can be expressed using the X, Y and Z axes given by a t-parameter representation. Assuming that the rotary angle changes from the start point position at time t=0 to the end point position at time t=1, then interpolation equations are:

$$RX=Wxe*t+(Rxe-Wxe)$$

$$RY=Wye*t+(Rye-Wye)$$

$$RZ=Wze*t+(Rze-Wze) \quad (24)$$

(8) A rotary angle is given to both the start and end points.

The rotary angles of the start and end points of an object in the object coordinate system are given by (Rxs, Rys, Rzs) and (Rxe, Rye, Rze) respectively in the parent object coordinate system. The rotary angle can be expressed using the X, Y and Z axes given by a t-parameter representation. Assuming that the rotary angle changes from the start point position at time t=0 to the end point position at time t=1, then interpolation equations are:

$$RX=(-Rxs+Rxe)*t+Rxs$$

$$RY=(-Rys+Rye)*t+Rys$$

$$RZ=(-Rzs+Rze)*t+Rzs \qquad (25)$$

(9) A rotary angle is given to the start point, and an angular velocity is given to the end point.

The rotary angle of the start point of an object in the object coordinate system is given by (Rxs, Rys, Rzs) in the parent object coordinate system, and the angular velocity at the end point is given by (Wxe, Wye, Wze) in the parent object coordinate system. The rotary angle can be expressed using the X, Y and Z axes given by a t-parameter representation. Assuming that the rotary angle changes from the start point position at time t=0 to the end point position at time t=1, then interpolation equations are:

$$RX=Wxe*t+Rxs$$

$$RY=Wye*t+Rys$$

$$RZ=Wze*t+Rzs \qquad (26)$$

(10) An angular velocity is given to the start point, and a rotary angle is given to the end point.

The rotary angle of the end point of an object in the object coordinate system are given by (Rxe, Rye, Rze) in the parent object coordinate system, and the angular velocity at the end point is given by (Wzs, Wys, Wzs) in the parent object coordinate system. The rotary angle can be expressed using the X, Y and Z axes given by a t-parameter representation. Assuming that the rotary angle changes from the start point position at time t=0 to the end point position at time t=1, then interpolation equations are:

$$RX=Wxs*t+(Rxe-Wxs)$$

$$RY=Wys*t+(Rye-Wys)$$

$$RZ=Wze*t+(Rze-Wzs) \qquad (27)$$

(11) A rotary angle is given to the start point, or a rotary angle is given to the end point.

The rotary angles of the start and end points of an object in the object coordinate system do not change in the parent object coordinate system. Namely, there is no rotation.

(12) An angular velocity is given to both the start and end points, an angular velocity is given to the start point, or an angular velocity is given to the end point.

In this case, interpolation equations cannot be obtained, so such a designation is considered as a fault.

In practical use, a desired rotation motion is set by consecutively coupling the above-described interpolation equations. In coupling interpolation equations, the end point rotary angle obtained by a set of interpolation equations must be the same as the start point rotary angle obtained by the next set of interpolation equations. In other words, the start point rotary angle obtained by a set of interpolation equations must be always the same as the end point rotary angle obtained by the preceding set of interpolation equations to be coupled to the former set.

The rotary angle of an object at a control time, which angle can be set by an operator, is called a control rotary angle. The angular velocity of an object immediately before a control time is called an input side control angular velocity. The angular velocity of an object immediately after a control time is called an output side control angular velocity. A same angular velocity commonly used as the input and output side control angular velocities is called a common control angular velocity.

A proper mode is selectively set for inputting a control rotary angle, input side control angular velocity, output side control angular velocity, common control angular velocity, or a combination thereof, at each control time. Which mode is being set at each control time, i.e., which input among the control rotary angle, input side control angular velocity, output side control angular velocity, and common control angular velocity is being permitted, may be identified by discriminately displaying a black circle, an arrow, or a particular color on the screen which displays a motion path.

For defining a rotary angle by coupling a plurality of interpolation equations described above at a plurality of preset control times, a single rotary angle setting representative control time is set. This rotary angle setting representative control time may be the same as the representative control time used for designating a position of an object, or a different one. It is always necessary to set a control rotary angle at the rotary angle setting representative control time. In obtaining a rotary angle after the rotary angle setting representative control time, the end point rotary angle obtained by interpolation equations one interpolation section before the object interpolation section should be always made the same as the start point rotary angle obtained by interpolation equations for the object interpolation section. In other words, interpolation calculation progresses toward the future time. Therefore, the mode for such interpolation among the above-described modes is only the mode which allows to enter the rotary angle of an object at the start point. In obtaining a rotary angle before the rotary angle setting representative control time, the start point rotary angle obtained by interpolation equations one interpolation section after the object interpolation section should be always made the same as the end point rotary angle obtained by interpolation equations for the object interpolation section. In other words, interpolation calculation progresses toward the past time. Therefore, the mode for such interpolation among the above described modes is only the mode which allows to enter the rotary angle of an object at the end point. If the input side control angular velocity is set at the first control time, the interpolation equations described in section (7) can be used for the time period before the control time. Similarly, if the output side control angular velocity is set at the last control time, the interpolation equations described in section (6) can be used for the time period after the control time.

An interpolation mode for interpolating a section between adjacent control times is determined in accordance with whether an output side control angular velocity and/or control rotary angle is given to the start point or whether an input side control angular velocity and/or control rotary angle is given to the end point. Even if a control rotary angle is not given for a control time after the rotary angle setting representative control time, there is used an interpolation mode same as that when a control rotary angle is given to the start point. The reason for this is that the control rotary angle at the end point of the preceding interpolation section is used as the control rotary angle at the start point of the interpolation section in concern. Similarly, even if a control rotary angle is not given for a control time before the rotary angle setting representative control time, there is used an interpolation mode same as that when a control rotary angle is given to the end point. The reason for this is that the control rotary angle at the start point of the succeeding interpolation section is used as the control rotary angle at the end point of the interpolation section in concern. In view of the above, although the following description is directed to the case where a control rotary angle for a control time after the rotary angle setting representative control time is not given to the start point, quite the same description is applicable to the case where a control rotary angle is given to the start point. Similarly, although the following description is directed to the case where a control rotary angle for a control time before the rotary angle setting representative control time is not given to the end point, quite the same description is applicable to the case where a control rotary angle is given to the end point.

First, the description will be given for each interpolation section after the rotary angle setting representative control time. If an output side control angular velocity is given to the start point, and a control rotary angle and input side control angular velocity are given to the end point, then there are used the interpolation Equations (18) described in section (1). If an output side control angular velocity is given to the start point, and a control rotary angle is given to the end point, then there are used the interpolation Equations (19) described in section (2). If no information is given to the start point, and a control rotary angle and input side control angular velocity are given to the end point, then there are used the interpolation Equations (20) described in section (3). If an output side control angular velocity is given to the start point, and an input side control angular velocity is given to the end point, then there are used the interpolation Equations (21) described in section (4). If an output side control angular velocity is given to the start point, and no information is given to the end point, then there are used the interpolation Equations (23) described in section (6). If no information is given to the start point, and a control rotary angle is given to the end point, then there are used the interpolation Equations (25) described in section (8). If no information is given to the start point, and an input side control angular velocity is given to the end point, then there are used the interpolation Equations (26) described in section (9). If no information is given to both the start and end points, then there are used the interpolation equations described in section (11).

Next, the description will be given for each interpolation section before the representative control time. If a control rotary angle and output side control angular velocity are given to the start point, and an input side control angular velocity is given to the end point, then there are used the interpolation Equations (18) described in section (1). If a control rotary angle is given to the start point, and an input side control angular velocity is given to the end point, then there are used the interpolation Equations (20) described in section (3). If a control rotary angle and output side control angular velocity are given to the start point, and no information is given to the end point, then there are used the interpolation Equations (19) described in section (2). If an output side control angular velocity is given to the start point, and an input side control angular velocity is given to the end point, then there are used the interpolation Equations (22) described in section (5). If no information is given to the start point, and an input side control angular velocity is given to the end point, then there are used the interpolation Equations (24) described in section (7). If a control rotary angle is given to the start point, and no information is given to the end point, then there are used the interpolation Equations (25) described in section (8). If an output side control angular velocity is given to the start point, and no information is given to the end point, then there are used the interpolation Equations (27) described in section (10). If no information is given to both the start and end points, then there are used the interpolation equations described in section (11).

Furthermore, if an input side control angular velocity is given for the first control time, the interpolation Equations (24) described in section (7) are used for an interpolation section before the first control time. If an output side control angular velocity is given for the last control time, the interpolation Equations (23) described in section (6) are used for an interpolation section after the last control time. If there is only one control time and both the input and output side control velocities are not given for the control time, there are used the interpolation equations described in section (11).

It is possible to determine whether information is to be set for a control time indicated by a control time indicator on the time line editors shown in FIGS. 22 and 23 selected by a position indicator. Namely, it is possible to determine whether a control rotary angle, input side control angular velocity, or output side control angular velocity is to be set for a certain control time.

Instead of the above-described method, there is used another method of designating an angle while incorporating a restriction condition. According to this method of designating an angle while incorporating a restriction condition, information at a control time is not used for designating an angle, but a restriction condition defined by another object is used. In the following, the restriction conditions adopted in this embodiment will be described.

(1) Point Restriction Condition

Figure 25:
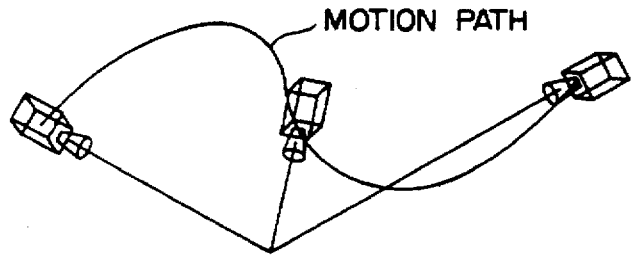

There are inputted information on a target object and a target point represented by a coordinate value in the target object coordinate system. If the world is designated as a target object, a subject object always faces in the direction designated in the absolute coordinate system. Such designation can be applied, for example, to the case where a camera moves while taking a car as illustrated in FIG. 25.

FIGS. 25 to 28 are display examples on the screen of a CRT display 101 serving as the display means.

(2) Line Restriction Condition

Figure 26:
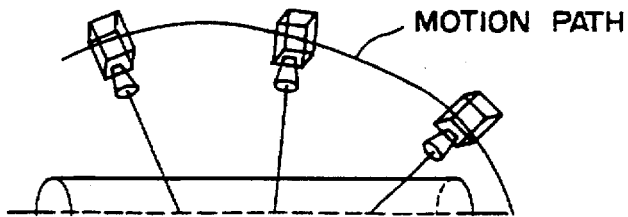

There are inputted information on a target object and a target straight line represented by a straight line in the target object coordinate system. For example, as shown in FIG. 26, a subject object is rotated to always face in the direction of a straight line which is perpendicular to the target straight line and extends through the subject object.

(3) Plane Restriction Condition

Figure 27:
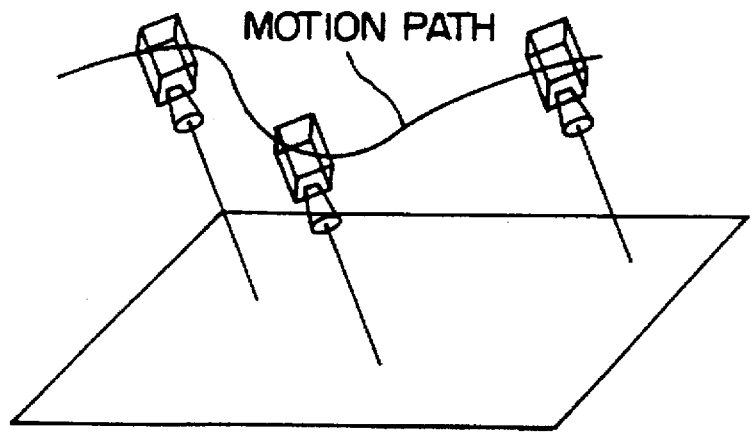

There are inputted information on a target object and a target plane represented by a flat plane in the target object coordinate system. For example, as shown in FIG. 27, a subject object is rotated to always make the object facing direction direct to the normal line direction of the target plane.

(4) Velocity Vector Restriction Condition

Figure 28:
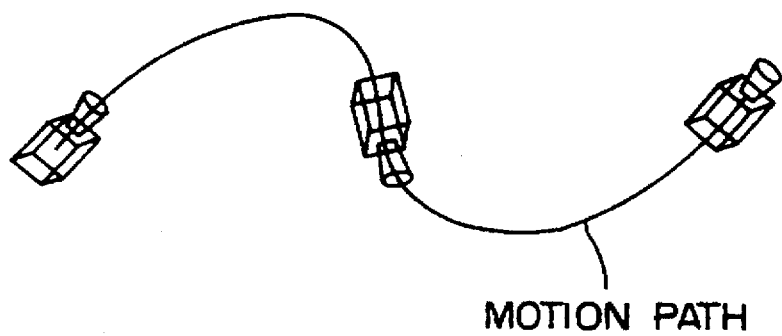

For example, as shown in FIG. 28, a subject object is rotated to always make the object facing direction direct in the motion direction, i.e., in the tangent line direction of the motion path.

Figure 29:
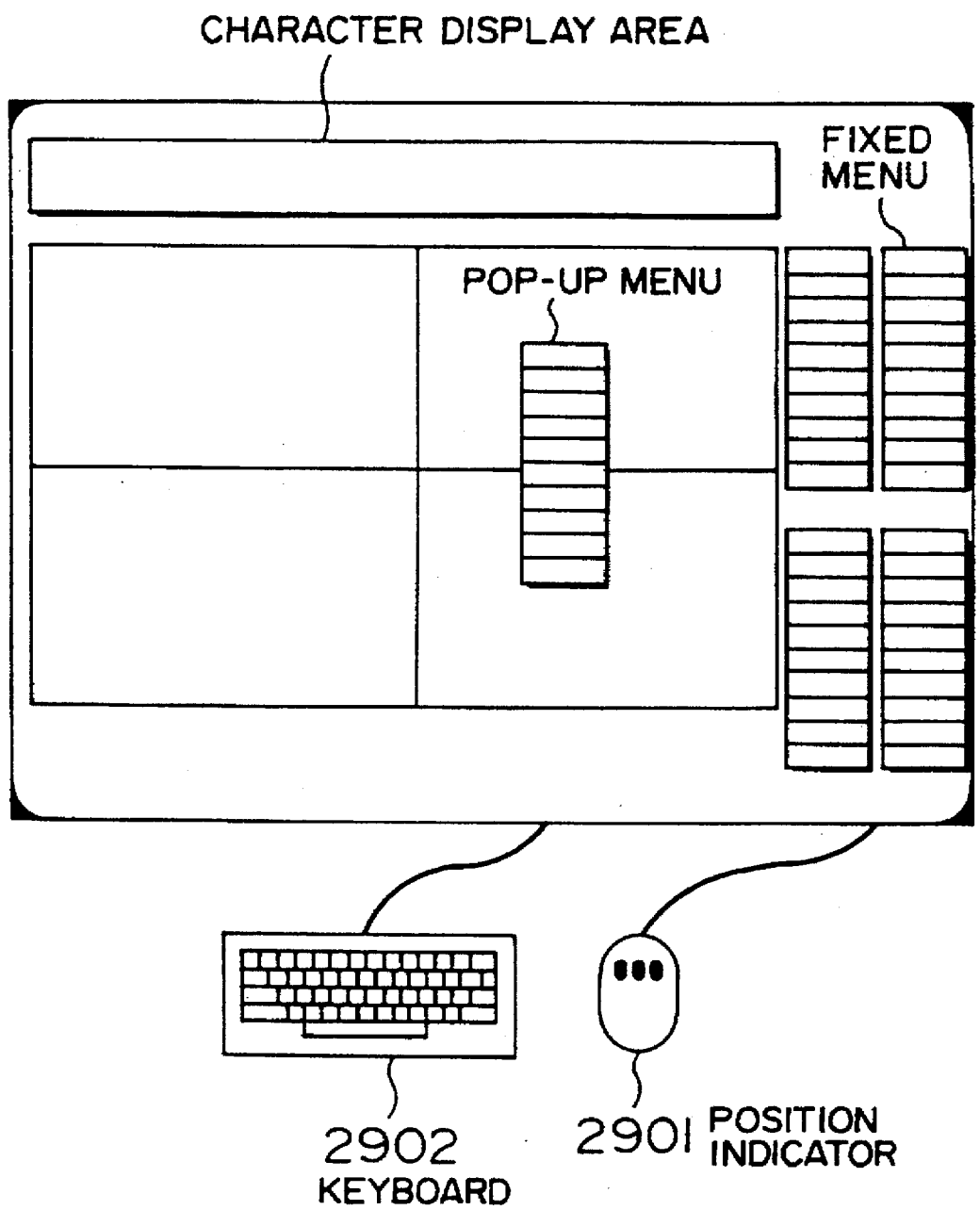

FIG. 29 shows a display example of a basic operation frame on a CRT display 101 serving as the display means according to the embodiment. An operation is basically performed using a position pointer 2901 with switches, and a keyboard 2902. First, an operation subject component is selected using the position pointer 2901, and thereafter an operation command is entered. As a method of selecting an operation subject object by using the position pointer 2901, there are a method of selecting an operation subject object by directly designating it with a position pointer and depressing a switch, and a method of selecting operation subject objects by designating a rectangular area containing the objects and selecting a plurality of objects at a time. If the former method is used for selecting an object, the name of an selected subject object and the specific component number are displayed on a character display area to be described later. Using other methods, all components can be selected by designating a whole component selection command in a pop-up menu to be described later, or a component can be selected one at a time by designating a component name on a time line editor. If a component already selected is again selected, this component enters a non-selection state.

The operation screen is used either in a four-division display mode or in a non-division display mode. In the four-division mode, three triangular diagrams are displayed on the upper left area, lower left area, and lower right area, and an image as viewed from a camera or a perspective view as viewed from an optional angle is selectively displayed on the upper right area. This upper right area is called the fourth plane. The non-division mode is a mode wherein a desired display area in the four-division mode is magnified and displayed on the whole screen area. A character display area at the upper end portion is an area on which a command entered from the keyboard or one of the various states of the system is displayed. Four fixed menus at the right side end portion include a shape inputting and display controlling menu, an attribute setting menu, a motion setting menu, and an image rendering menu. Each menu is displayed at a normal lightness when the menu can be selected, and with a dark color when it cannot be selected. If a menu has a particular mode and is in a selectable state, a check mark is displayed in front of the menu name. As shown in FIG. 29, a pop-up menu can be called by depressing a switch on the position indicator. The analysis and type of commands included in the pop-up menu differ depending upon the position of the position pointer when a switch is depressed and depending upon the mode. The pop-up menu also includes only one most recently selected command in the four fixed menus.

The shape inputting and display control menu among the four fixed menus includes commands regarding shape input, component delete, component copy, parent designation, component magnification, component rotation, component movement, grid display, grid delete, normal display, ordinary display, rectangular solid display, no-display, rotation display, camera view angle, snap shot storage, and snap shot read. The function of each command will be described below.

The shape input command is a command for inputting an externally defined three-dimensional shape. If the name of a file storing a shape data and the format of the shape data are given, the shape data is obtained. The file may store a plurality of components, the names of components and the hierarchic structure thereof being stored and a unique component number being automatically assigned to each component. All components having no parent are controlled so that they have the world as their parent.

The component delete command is a command for completely deleting a component already selected.

The component copy command is a command for generating another component by sharing the shape data of a component already selected. A component generated by this command shares the shape data with another component. Therefore, if a component magnification command, component rotation command, or component movement command is executed for one of the shape sharing components, other components are influenced by the executed command.

The parent designation command is a command for designating a parent of a component already selected. If the name of a component serving as a parent or a component number is entered, the hierarchic structure of the components is reconstructed.

The component magnification command is a command for changing the size of a component using the component coordinate system as a reference. If the magnification factor or reduction factor for each axis of the component coordinate system is entered, magnification or reduction is performed at a corresponding factor.

The component rotation command is a command for rotating a component using the component coordinate system as a reference. If the rotary angle for each axis is entered, rotation is performed.

The component movement command is a command for moving a component using the component coordinate system as a reference. If the movement amount for each axis is entered, parallel motion is performed.

The grid display command is a command for displaying a reference coordinate system and reference plane of a component already selected.

The grid delete command is a command for deleting a reference coordinate system and reference plane of a component already selected.

The normal display command is a command for displaying a component coordinate system of only one component already selected at a normal position. If this command is executed under the condition that no component is selected, the world coordinate system is displayed at the normal position. The normal position is a position that a designated coordinate system becomes a reference coordinate system displaying three triangular diagrams.

The ordinary display command changes a display mode of a component already selected to an ordinary display mode. The ordinary display command is a command for rendering an image using an attribute value designated for each component. The attribute value will be described when the attribute setting menu is described.

The rectangular solid display command changes a display mode of a component already selected to a rectangular solid display mode. The rectangular solid display mode displays a rectangular solid with its specific color, the solid being obtained by drawing lines extending between maximum values and minimum values at each axis in the component coordinate system of a component. The object specific color will be described when the attribute setting menu is described.

The non-display command changes a display mode of a component already selected to a non-display mode. The non-display mode is a mode for suppressing a display of a subject component.

The rotation display command is a command for rotating a perspective view if it is displayed on the fourth plane, to thereby help determine the three-dimensional position of an object and set the locus.

The camera view angle command determines if an image taken by a camera or a perspective view as viewed from an optional angle is displayed on the fourth plane. If an image taken by a camera is displayed, a check mark is displayed in front of the camera view angle command.

The snap shot storage command is a command for storing all data presently edited into a file. If the name of a file is entered, this command is executed.

The snap shot read command is a command for reading data already edited. If the name of a file is entered, all data presently edited is once erased, and thereafter data is read from the designated file to allow editing.

The attribute setting menu among the four fixed menus includes commands regarding attribute editing, mapping, camera designation, and light source designation. The function of each command will be described below.

The attribute editing command opens a surface attribute editor if the already selected object is a component, opens a camera attribute editor if the object is a camera, and opens a light source attribute editor if the object is a light source. If this command is selected when no object is selected, the surface attribute editor opens. Using the surface attribute editor, it is possible to edit the surface attribute of a designated object. If a plurality of components are selected, a surface attribute is given to each component. Each editor will be described later.

The mapping command opens a mapping editor for mapping a component already selected. If a plurality of objects are selected, the same mapping operation is performed for each object by using a parameter designated by the mapping editor.

The camera designation command is a command for designating an already selected component as a camera. If another component has been designated as a camera, such designation is canceled, and the component designated by this command is newly designated as a camera.

The light source designation command is a command for designating an already selected component as a light source. A component designated as a light source is displayed with a light source specific color. If this command is executed for a component already designated as a light source, such light source designation is canceled, and the designated component becomes an ordinary component.

The motion setting menu among the four fixed menus includes commands regarding locus display, locus delete, time line editor display, motion editing, and motion read. The function of each command will be described below.

The locus display command is a command for displaying the motion path of a component already selected.

The image rendering menu among the four fixed menus includes commands regarding background editing, image synthesizing, hardware image rendering, and software image rendering.

Next, another embodiment of the present invention will be described.

In the actual phase, the characteristics of a light reflected from the surface of an object depend not only on the characteristics of a light source, but also on the characteristics of the surface of an object. In the field of computer graphics, a desired material image quality is obtained by expressing the characteristics of the surface of an object. Light reflected from the surface of an object is classified into a diffuse light and a specular light. The diffuse light is the components of light which once entered an object and then is unidirectionally radiated from the surface of the object. The specular light is the components of light which is mirror-reflected at the surface of an object.

In the field of computer graphics, the following equation is generally used for determining the brightness or luminance on the surface of an object.

$$I = Ia*Ka + Id*Kd* \cos(A) + Is*Ks*W(B) \quad (28)$$

I: a determined luminance on an object surface,

Ia, Ib, Is: a parameter indicating the characteristics of a light source,

Ka: an intensity of ambient light,

Kd: an intensity of diffuse light,

Ks: an intensity of specular light.

The first term (ambient light components) of the Equation (28) represents the light components illuminated with an ambient light excepting a light source. This term is provided for preventing a portion not directly illuminated with the light source from becoming blackish.

The second term (diffuse light components) of the Equation (28) is a term representing the Lambert cosine rule which is applied when light from a light source is perfectly diffused and reflected. "A" of cos(A) is an angle between a normal line on the object surface and the direction of the light source as viewed from the object surface. This term indicates the components of color specific to an object such as plastic and plaster.

The third term of the Equation (28) is a term indicating the specular light components. "B" of W(B) is an angle between the direction of an angle of view and the direction of normal reflection at the mirror surface, and W(B) is a function indicating an attenuation when the angle of view shifts from the direction of normal specular reflection. The specular light components play an important role of expressing the object material quality image. For example, the specular light components of an object such as plastic have the same color as that of a light source. Namely, if the light source radiates a white light, the specular light of the plastic becomes white, and if the light source radiates a red light, the specular light becomes red. On the contrary, those of a metal, solid paint and the like have a different color from that of a light source. For example, if copper is illuminated by a white light, the specular light components become a color specific to copper, i.e., red.

Ka, Kd, and Ks represent color vector information, each being capable of being represented by a combination of R, G, and B. A combination of Ka, Kd, and Ks allows an expression of various material quality images. However, a conventional way to determine a combination of R, G, and B which designates Ka, Kd, or Ks has required considerable skills. In this embodiment, Ka is not designated by a combination of R, G, and B, but it is designated as (H, αaL, S) where $0 \leq \alpha \leq 1$, by representing an object color in an (H, L, S) color model. Similarly, Kd is designated as (H, ed, S) where $0 \leq \alpha d \leq 1$. Ks is designated as (H, αd, S) where $0 \leq \alpha s \leq 1$ and $0 \leq \beta s \leq 1$. A "flat" color is expressed by setting βs=0, and αs=0. The color of plastic is expressed by setting βs=0, and the color of metal is expressed by setting βs=1. Each of the designated Ka, Kd, and Ks is converted into a combination of R, G, and B through calculation by a computer. Ka and Kd are assigned a color which depends on the color specific to an object, and the reflection intensity can be set independently from each parameter. Ks is assigned a color specific to an object, white color, or intermediate color to determine the reflection intensity.

Figure 30:
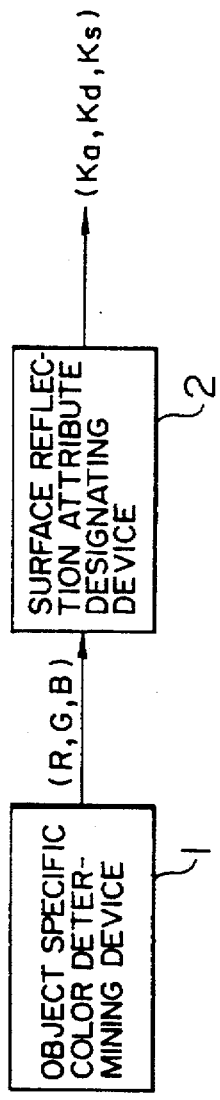
FIG. 30 shows the structure of the main part of a computer graphics system according to an embodiment of the present invention.

FIG. 30 shows the structure of the main part of a computer graphics system according to the embodiment of the present invention. An object specific color determining device 1 determines a color specific to an object. For example, if the material quality image of red plastic or copper is to be realized, a "red" color is used as the object specific color. The object specific color determining device determines the color tone of an object, by using R, G, and B three primary colors and in accordance with the "color" and "intensity" an operator designated. In this embodiment, an operator can linearly designate the color and intensity using sliders, as will be later described with FIG. 34. However, selectable color candidates may be displayed for an operator by using a computer, and the color the operator selected may be used as an object specific color.

Figure 31:
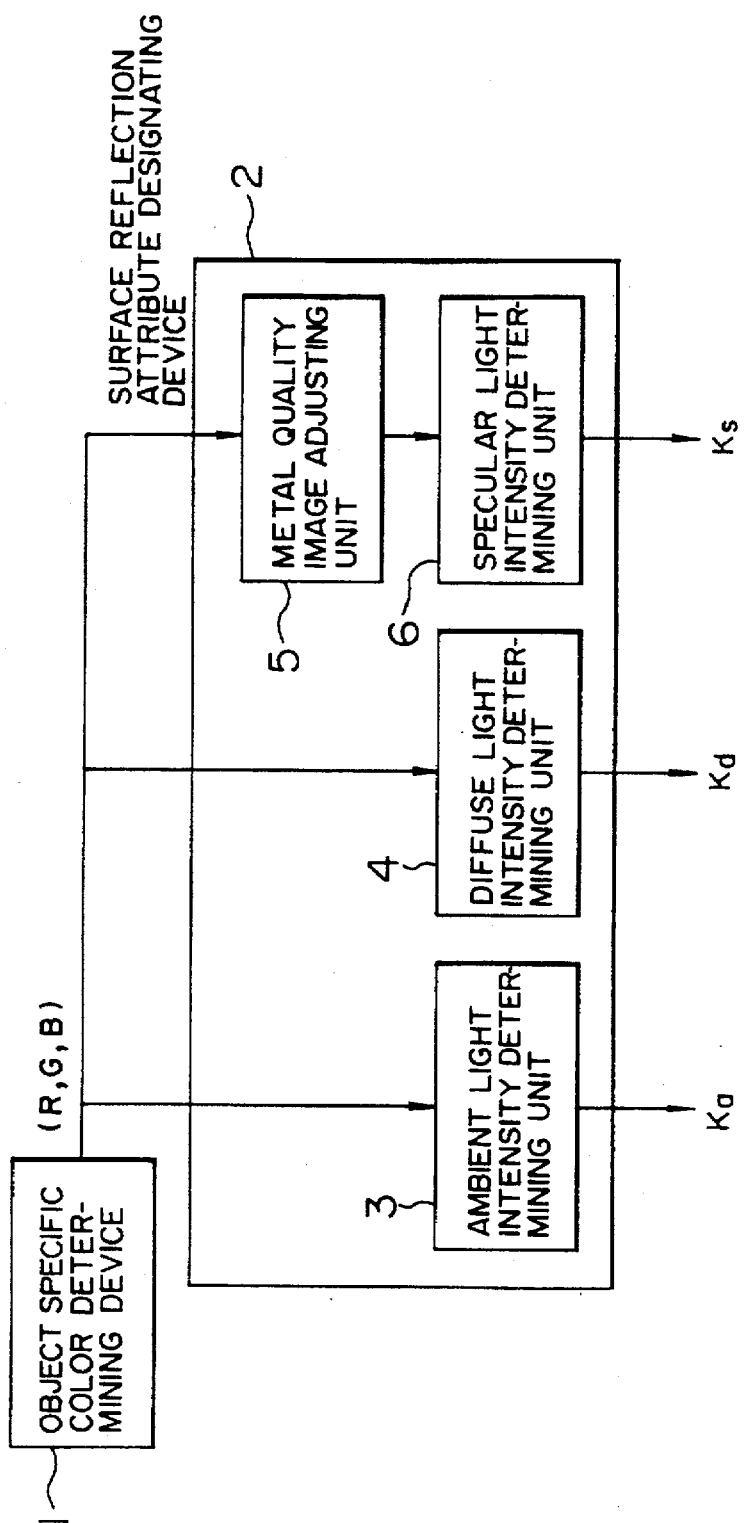
FIG. 31 shows the detailed structure of the surface reflection attribute setting device of FIG. 30.

The details of a surface reflection attribute designating device 2 of FIG. 30 are shown in FIG. 31. The surface reflection attribute designating device 2 is constructed of an ambient light intensity determining unit 3, diffuse light intensity determining unit 4, metal quality image adjusting unit 5, and specular light intensity determining unit 6.

The ambient light intensity (Ka) determining unit 3 receives RGB data representative of an object specific color from the object specific color determining device 1, and converts the received data into a data in the HLS color model. Then, (H, αaL, S) is obtained using an operator designated αa in the manner described above, and converted into a data in the RGB color model to calculate Ka.

Similarly, the diffuse light intensity (Kd) determining unit 4 converts the RGB data into an HLS data. Then, (H, αdL, S) is obtained using an operator designated αd, and converted into an RGB color model to calculate Kd.

Similarly, the metal quality image adjusting unit 5 receives an RGB data and converts it into an HLS data. Then, (H, L, βsS) is obtained using an operator designated βs. The specular light intensity (Kd) determining unit 6 obtains (H, αsL, βsS) using an operator designated αa and converts it into a data in the RGB color model to calculate Ks.

Figure 32:
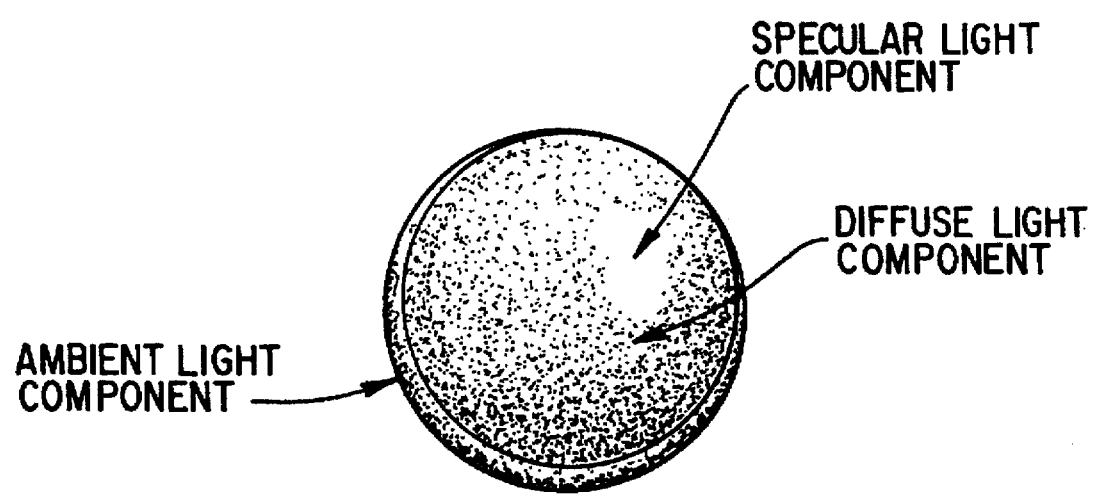
FIG. 32 shows a sphere illuminated with a light source.

FIG. 32 illustrates a sphere illuminated by a single light source. The above-described Ka, Kd, and Ks determine the area and brightness at each point of the sphere. In FIG. 32, the ambient light component is determined by the parameter Ks to express a portion which is not directly illuminated with the light source. A diffuse light component is determined by the parameter Kd to express a portion which is directly illuminated with the light source. The specular light component is determined by Ks to express a portion where light is mirror-reflected at the object surface and becomes incident to eyes.

Figure 33:
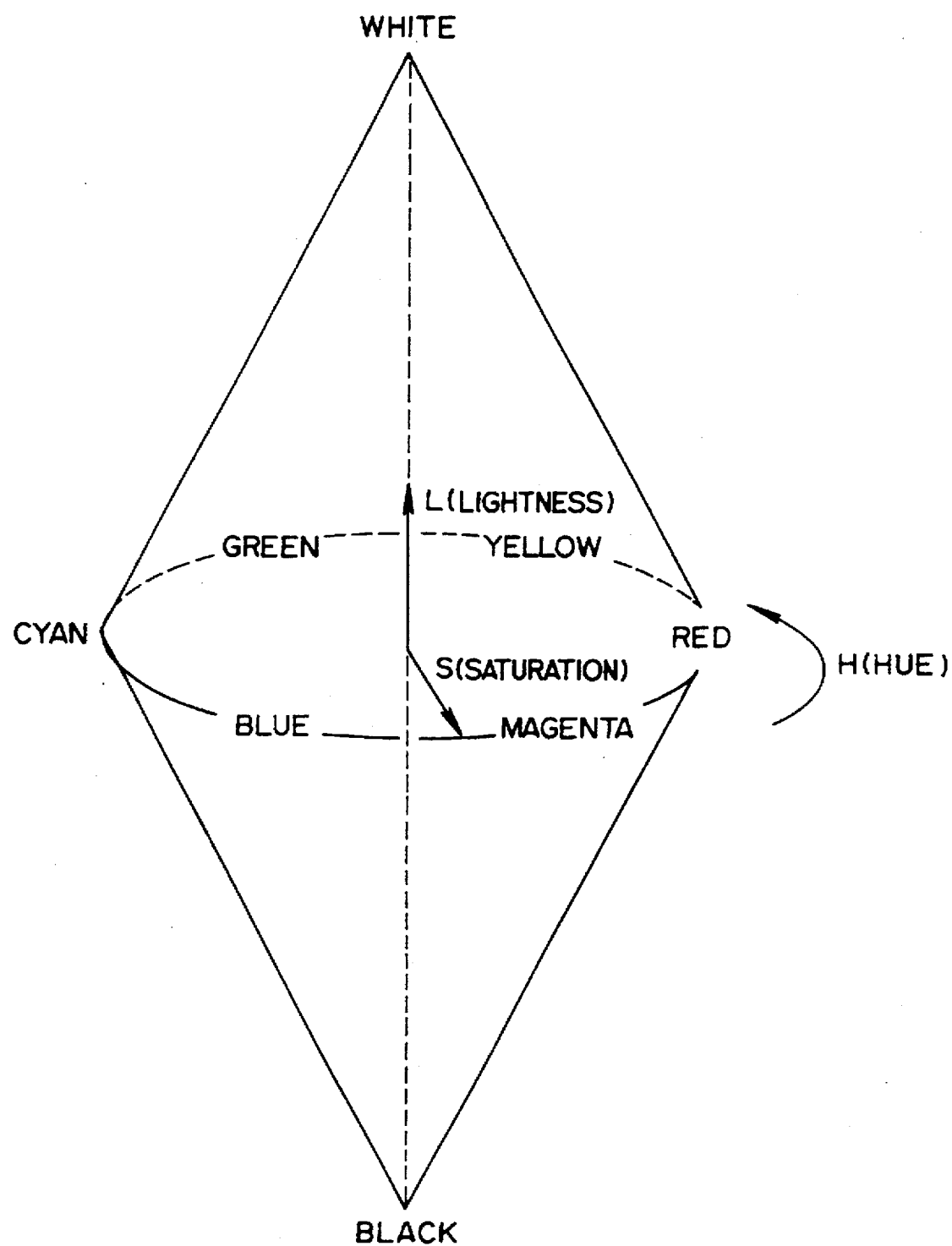
FIG. 33 illustrates an HLS color model.

Next, determining a color specific to an object will be described. In determining a color, RGB three colors are generally used to express a color tone by setting color intensities. However, in this embodiment, an object specific color is determined-using the HLS color model. FIG. 33 illustrates an HLS color model. A color is identified by entering three parameters including H (hue), L (lightness), and S (saturation). The hue H takes a value from 0 degree to 360 degrees. 0 degree represents "red", 60 degrees represent "yellow", 120 degrees represent "green", 180 degrees represent "cyan", 240 degrees represent "blue", and 300 degrees represent "magenta". The lightness L takes a value from 0.0 to 1.0. A value 0.0 represents "black", a value 1.0 represents "white", the other values represent colors corresponding to the hue H and saturation S. The saturation S takes a value from 0.0 to 1.0. A value 0.0 represents an "achromatic color", i.e., "gray", and a value 1.0 represents a "pure color". By changing the saturation S, it is possible to continuously change the color from "gray" to "pure" while retaining the same "lightness" and "hue". Using a proper combination of HLS, an operator can designate a desired color.

Figure 34:
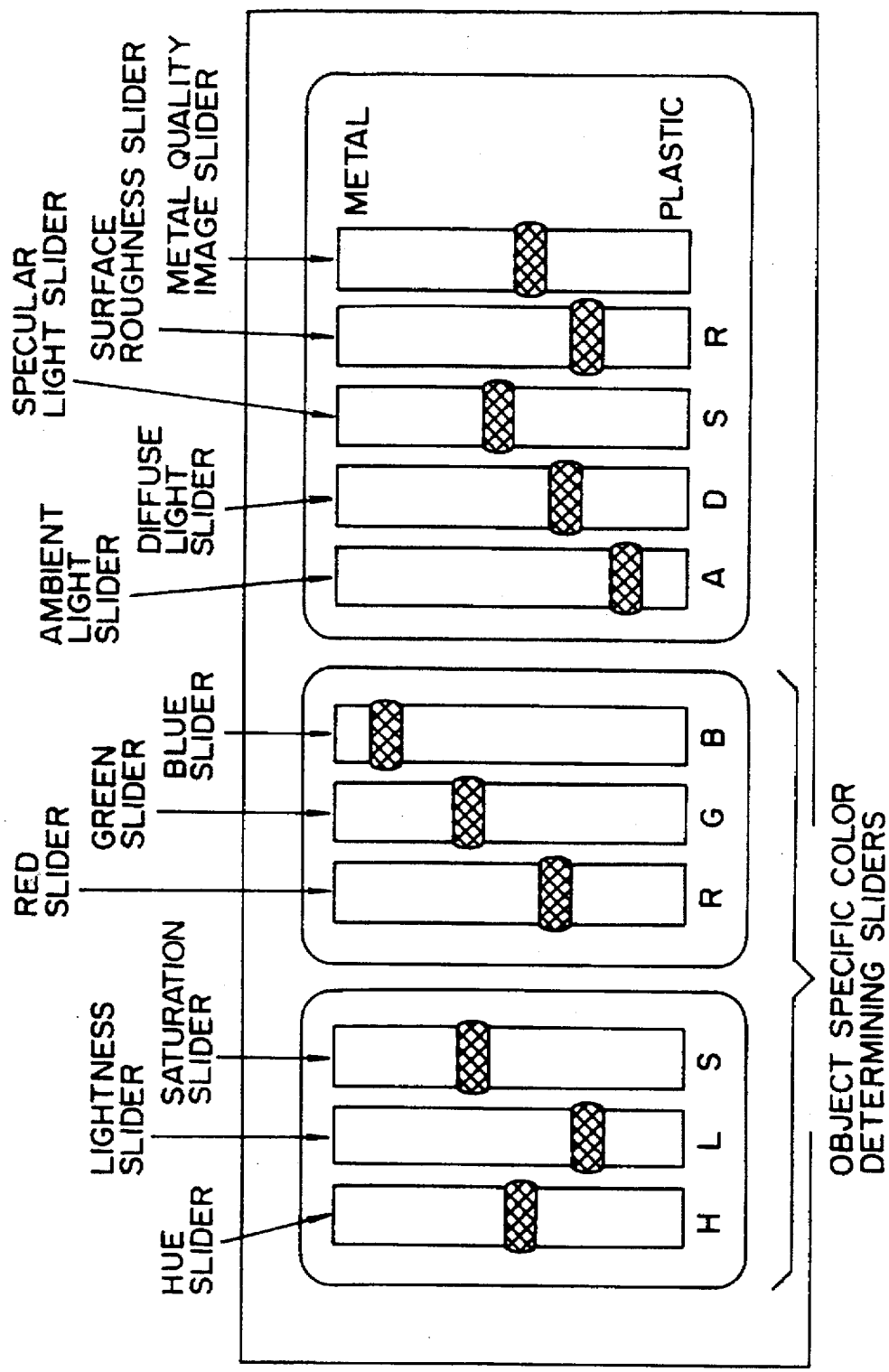
FIG. 34 illustrates a user interface.

FIG. 34 shows the structure of a material quality image setting user interface. Each slider shown in FIG. 34 may use a real slider switch or may be realized by displaying a simulated image on the computer screen. A combination of three sliders for hue, lightness, and saturation is used for designating a color specific to an object. Similarly, a combination of three sliders for red, green, and blue is used for designating a color specific to an object. The combination of the hue, lightness, and saturation sliders is related to the combination of red, green, and blue sliders, so that if a slider of one of the combinations is moved, the slider of the other combination is also moved to match the movements therebetween. An operator selects a desired one of the combinations to designate a color specific to an object.

Figure 35:
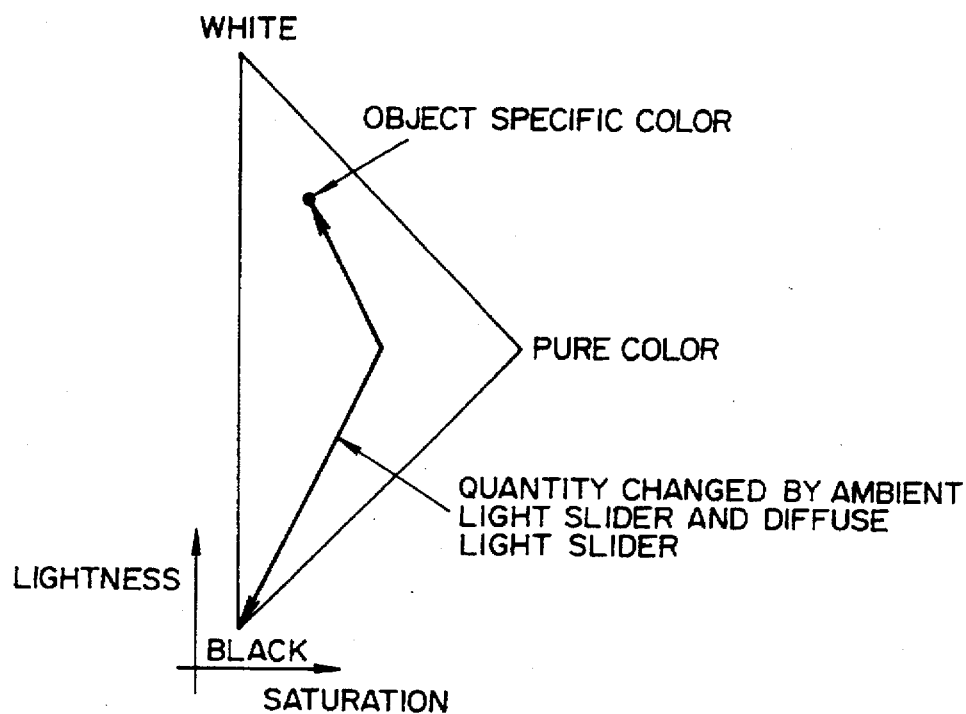
FIG. 35 illustrates the effects of an ambient light slider and a diffuse light slider.
Figure 36:
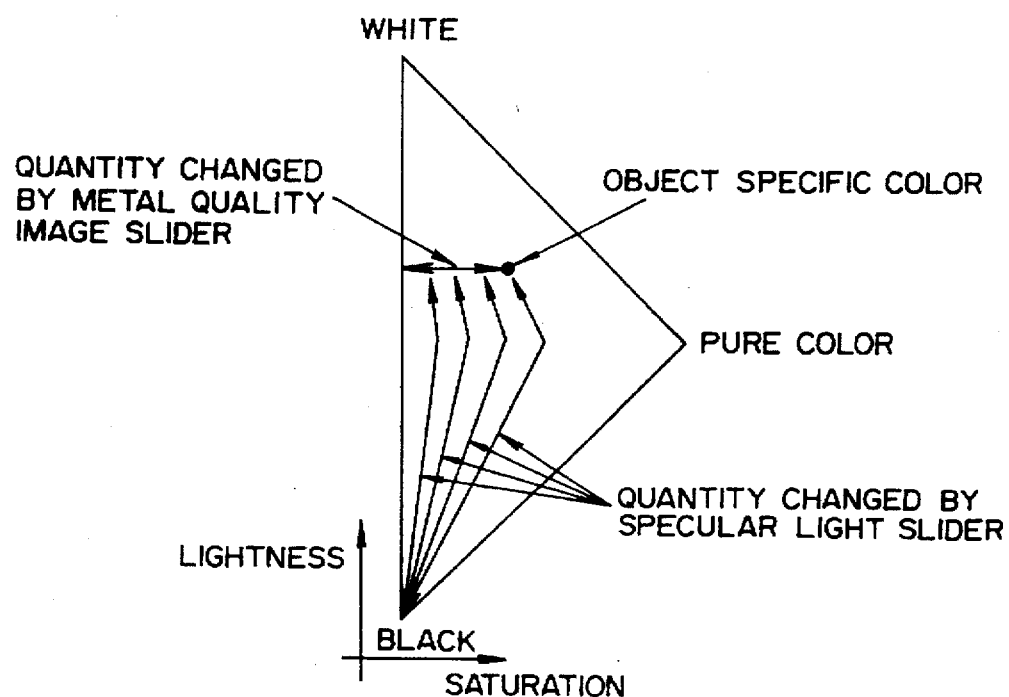
FIG. 36 illustrates the effects of a metal image quality slider and a specular light slider.

In this embodiment, as the sliders for designating a reflection attribute, there are provided an ambient light slider, diffuse light slider, specular light slider, metal quality image slider, and surface roughness slider. FIG. 35 is a cross sectional view of a color model. Colors on the cross section all have the same saturation, and include an object specific color. If the ambient light slider is moved to change the lightness component of the object specific color, the value of Ka continuously changes from the object specific color to a black point as shown by a bold line. The diffuse light slider determines Kd by changing the lightness component of an object specific light. The surface roughness slider is used for determining an area of a specular reflection component (refer to FIG. 32). The metal quality image slider is used for changing the saturation component of an object specific color as shown in FIG. 36, the result being a continuous change from the object specific color to the achromatic color (gray color). If the metal quality image slider is moved toward the Metal side, the saturation component goes near the object specific color, and if it is moved toward the Plastic side, the component goes near the achromatic color. As shown in FIG. 36, the specular light slider determines Ks by changing the lightness component of the color determined by the metal quality image slider.

Figure 37:
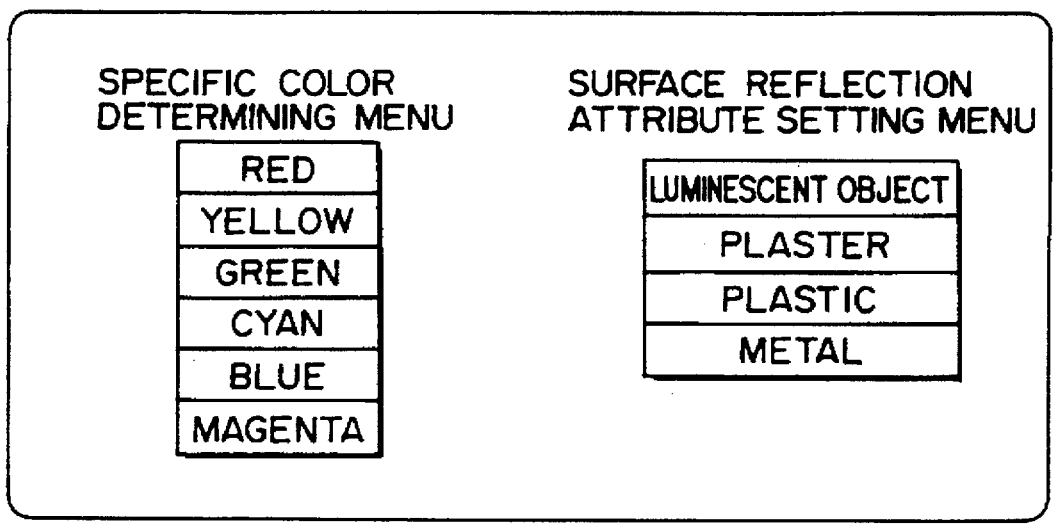
FIG. 37 illustrates a user interface according to another embodiment.

FIG. 37 shows the structure of another user interface different from that shown in FIG. 34. In this embodiment, an operator selectively designates appropriate ones of an object specific color and reflection attribute from menus displayed on the screen. In this embodiment, each parameter has a dispersed value, in contrast to the embodiment shown in FIG. 34 wherein each parameter can be linearly designated. When an operator designates menus, the object specific color data and reflection attribute data corresponding to the designated menus are read from a memory device so that the units described with FIG. 30 calculate Ka, Kd, and Ks.

The user interfaces shown in FIGS. 34 and 37 may be used by combining them together. For example, it may be constructed such that an operator selects an object specific color by using the user interface shown in FIG. 34 and a reflection attribute by using the user interface shown in FIG. 37, or vice versa. Furthermore, it may be constructed such that an operator first roughly selects an object specific color and reflection attribute by using menus, and then finely sets them by using the user interface shown in FIG. 34.

Next, there will be described a method of obtaining the material quality image of a typical object by using the user interface shown in FIG. 34.

In expressing a luminescent object, the luminescent color of the object is first designated by using either a combination of hue, lightness, and saturation sliders, or a combination of red, green, and blue sliders. Next, the ambient light slider is set to a sufficiently large value. With such a sufficiently large ambient light component, the material quality image of the luminescent object is expressed. The sliders for designating a reflection attribute (sliders for diffuse light, specular light, surface roughness, and metal quality image) are set to arbitrary values as desired.

Also, in expressing an object having a flat color such as plaster, the object specific color is first designated. The specular light slider is set to the minimum value to suppress a gross color from being displayed. The diffuse light slider is set to an arbitrary value to adjust the brightness of a portion under illumination. Then, the ambient light slider is used to adjust the brightness of a portion not under illumination.

In expressing a plastic object having a gross color, first the object specific color is designated. The ambient light slider and diffuse light slider are adjusted in the manner similar to the case of plaster, the metal quality image slider is moved to the Plastic side to set the color of a specular light component to an achromatic color, and the specular light slider is set to an arbitrary value, to thereby adjust the brightness of a portion having a gross color. Furthermore, the surface roughness slider is used to adjust the area of the gross color portion. In this case, since Ks is set to the achromatic color, the specular reflection component has the same color as that of the light source whatever the object specific color is.

Also, in expressing a metal object having a gross color, first the object specific color is determined. The diffuse light slider is ordinarily set to the minimum value to suppress the diffuse light. The ambient light slider is set to a suitable value while considering the image effect. The metal quality image slider is moved toward the Metal side to make the specular light component have the object specific color, and the specular light slider is set to an arbitrary value, to thereby adjust the brightness of the gross color portion. Furthermore, the surface roughness slider is used to adjust the area of the gross color portion. In this case, since Ks is set to the object specific color, the specular light component has the object specific color if, for example, the object is illuminated with white light.

In the above-described embodiment, the lightness L component in the HLS color model has been changed to adjust the ambient light component intensity, diffuse light component intensity, and specular light component intensity. The present invention is not limited thereto, but any one of the color model components may be changed if it changes the light intensity. For example, in FIG. 35, the value on the line interconnecting an object specific color and the black color point may be changed, resulting in similar effects described above. Furthermore, in the embodiments, the adjustment of the specular reflection color by using the metal quality image slider has been achieved by changing the saturation component of the HLS color model. The present invention is not limited to such embodiment, but any method may be used if it can interpolate between the achromatic color and an object specific color. For example, in FIG. 36, the value on the line interconnecting an object specific color and the white color point may be changed, resulting in similar effects described above.

According to the present invention, the motion path of an object is controlled using at least one of the magnitude and direction of a velocity, object facing direction, and time. Therefore, the motion of an object can be intuitively designated.

Furthermore, the motion at the joint between key frames can be made smooth by making the velocity at the end point of a locus same as that at the start point of the next locus.

Still further, an intermediate point designated on the path can be registered as a new key frame so that the path can be designated finely.

According to the present invention, the color specific to an object is set independently from the reflection attribute so that even a general person can designate the color easily, quickly, and intuitively.

The other independent characteristic features of the present invention will be described below.

1. A method and apparatus for generating a computer graphics animation, comprising a shape inputting and modifying unit, an attribute setting unit, a motion designating unit, and an image rendering unit.

2. A method and apparatus for generating a computer graphics animation as recited in item (1), wherein the shape inputting and modifying unit has a shape defining user interface allowing a user to interactively define a shape.

3. A method and apparatus for generating a computer graphics animation as recited in item (1), wherein the shape inputting and modifying unit receives an externally defined shape data.

4. A method and apparatus for generating a computer graphics animation as recited in any one of items (1), (2), and (3), wherein the shape can be designated to modify an inputted shape data.

5. A method and apparatus for generating a computer graphics animation as recited in item (1), wherein the attribute setting unit can set an object specific color, a surface reflection attribute, a transmittance, a reflectance, and a way to perform mapping, respectively of an inputted shape.

6. A method and apparatus for generating a computer graphics animation as recited in item (1), wherein the attribute setting unit can set a view angle parameter, a focal length parameter, and a shutter speed parameter, respectively used when an image is rendered.

7. A method and apparatus for generating a computer graphics animation as recited in item (1), wherein the attribute setting unit can set the type of light source, and the color and intensity of a light radiated from the light source.

8. A method and apparatus for generating a computer graphics animation as recited in item (1), wherein the motion designating unit designates a motion by separating the motion into the position of an object, and the facing direction of the object at the position, respectively at a certain time.

9. A method and apparatus for generating a computer graphics animation as recited in any one of items (1) and (8), wherein the motion designating unit sets the motion of an object, a camera, and a light source, all in quite the same manner.

10. A method and apparatus for generating a computer graphics animation as recited in item (5), wherein means for designating the surface reflection attribute determines the color of an ambient light, diffuse light, specular light, and transmitted light by using a specific color of an object.

11. A method and apparatus for generating a computer graphics animation as recited in item (5), wherein means for designating the surface reflection attribute designates an ambient light, diffuse light, and transmitted light as having an object specific light, and designates a specular light as having the light source color.

12. A method and apparatus for generating a computer graphics animation as recited in item (5), wherein means for designating the surface reflection attribute designates an ambient light, diffuse light, specular light, and transmitted light as having an object specific color.

13. A method and apparatus for generating a computer graphics animation as recited in item (5), wherein means for designating the surface reflection attribute designates an ambient light, diffuse light, and transmitted light as having an object specific color, and designates a specular light as having the object specific color or a light source color depending upon a designated parameter.

14. A method and apparatus for generating a computer graphics animation as recited in item (5), wherein means for designating the surface reflection attribute designates an ambient light, diffuse light, and transmitted light as having an object specific color, and designates a specular light as having an intermediate color between the object specific color and a light source color in accordance with a designated parameter.

15. A method and apparatus for generating a computer graphics animation as recited in any one of items (10), (11), (12), (13), and (14), wherein the intensities of the ambient light, diffuse light, specular light, and transmitted light can be independently designated.

16. A method and apparatus for generating a computer graphics animation as recited in item (5), wherein means for designating the object specific color allows an operator to set a desired color.

17. A method and apparatus for generating a computer graphics animation as recited in item (5), wherein means for designating the object specific color operates such that a computer gives candidate colors and an operator selects a desired one of the candidate colors.

18. A method and apparatus for generating a computer graphics animation as recited in item (5), wherein means for designating the surface reflection attribute of an object operates such that a computer gives candidate colors and an operator selects a desired one of the candidate colors.

19. A method and apparatus for generating a computer graphics animation as recited in item (7), wherein means for designating the attribute of a light source includes means for determining the color specific to a light source, and means for determining the intensity of a light source.

20. A method and apparatus for generating a computer graphics animation as recited in item (19), wherein the means for determining the color specific to a light source determines the colors of a light source and an ambient light by using the color specific to the light source and a background light color.

21. A method and apparatus for generating a computer graphics animation as recited in item (19), wherein the means for determining the color specific to a light source uses the color of a light source as the color specific to the light source, and uses the color of an ambient light as the background light color.

22. A method and apparatus for generating a computer graphics animation as recited in item (19), wherein the means for determining the color specific to a light source uses the color of a light source and the ambient light color as the color specific to the light source.

23. A method and apparatus for generating a computer graphics animation as recited in item (19), wherein the means for determining the color specific to a light source uses the color of a light source as the color specific to the light source, and uses the color of an ambient light as the color specific to the light source or the background light color in accordance with a designated parameter.

24. A method and apparatus for generating a computer graphics animation as recited in item (19), wherein the means for determining the color specific to a light source uses the color of a light source as the color specific to the light source, and uses the color of an ambient light as an intermediate color between the color specific to the light source or the background light color in accordance with a designated parameter.

25. A method and apparatus for generating a computer graphics animation as recited in any one of items (20), (21), (22), (23), and (24), wherein the intensities of a light source and an ambient color can be independently designated.

26. A method and apparatus for generating a computer graphics animation as recited in item (19), wherein means for determining the color specific to a light source allows an operator to set a desired color.

27. A method and apparatus for generating a computer graphics animation as recited in item (7), wherein means for setting the attribute of a light source operates such that a computer gives candidate colors and an operator selects a desired one of candidate colors.

28. A method and apparatus for generating a computer graphics animation as recited in any one of items (8) and (9), wherein the motion designating unit sets a hierarchic structure between shapes and sets a motion by using a parent/child relation of the hierarchic structure.

29. A method and apparatus for generating a computer graphics animation as recited in any one of items (8) and (9) and (28), wherein the motion designating unit describes the motion of a shape as a relative motion to a parent shape, in accordance with a hierarchic structure between shapes.

30. A method and apparatus for generating a computer graphics animation as recited in item (8), wherein in designating the position of an object, two or more times are designated, one of the position, velocity, and position and velocity, respectively of the object, at the designated time, is designated, and a computer automatically generates a motion locus between designated times.

31. A method and apparatus for generating a computer graphics animation as recited in any one of items (8) and (30), wherein in designating the position of an object, a position and velocity of an object are given to each axis, and a computer performs an interpolation calculation for each axis.

32. A method and apparatus for generating a computer graphics animation as recited in item (30), wherein for the computer to automatically generate a motion path, two times are determined, an interpolation between the two times is performed, and interpolation sections are coupled together to generate the motion path.

33. A method and apparatus for generating a computer graphics animation as recited in item (32), wherein in determining two times and performing an interpolation between the two times, the positions and velocities at an interpolation start point and end point are given, and the position at each time point for each axis between the start and end points is expressed by a third order parameter representation.

34. A method and apparatus for generating a computer graphics animation as recited in item (32), wherein in determining two times and performing an interpolation between the two times, the position and velocity are given to the interpolation start point, the position is given to the interpolation end point, and the position at each time point for each axis between the start and end points is expressed by a second order parameter representation.

35. A method and apparatus for generating a computer graphics animation as recited in item (32), wherein in determining two times and performing an interpolation between the two times, the position is given to the interpolation start point, the position and velocity are given to the interpolation end point, and the position at each time point for each axis between the start and end points is expressed by a second order parameter representation.

36. A method and apparatus for generating a computer graphics animation as recited in item (32), wherein in determining two times and performing an interpolation between the two times, the position and velocity are given to the interpolation start point, the velocity is given to the interpolation end point, and the position at each time point for each axis between the start and end points is expressed by a second order parameter representation.

37. A method and apparatus for generating a computer graphics animation as recited in item (32), wherein in determining two times and performing an interpolation between the two times, the position is given to the interpolation start point, the position and velocity are given to the interpolation end point, and the position at each time point for each axis between the start and end points is expressed by a second order parameter representation.

38. A method and apparatus for generating a computer graphics animation as recited in item (32), wherein in determining two times and performing an interpolation between the two times, the position and velocity are given to the interpolation start point, no information is given to the interpolation end point, and the position at each time point for each axis between the start and end points is expressed by a first order parameter representation.

39. A method and apparatus for generating a computer graphics animation as recited in item (32), wherein in determining two times and performing an interpolation between the two times, no information is given to the interpolation start point, the position and velocity are given to the interpolation end point, and the position at each time point for each axis between the start and end points is expressed by a first order parameter representation.

40. A method and apparatus for generating a computer graphics animation as recited in item (32), wherein in determining two times and performing an interpolation between the two times, the position is given to the interpolation start point, the position is given to the interpolation end point, and the position at each time point for each axis between the start and end points is expressed by a first order parameter representation.

41. A method and apparatus for generating a computer graphics animation as recited in item (32), wherein in determining two times and performing an interpolation between the two times, the position is given to the interpolation start point, the velocity is given to the interpolation end point, and the position at each time point for each axis between the start and end points is expressed by a first order parameter representation.

42. A method and apparatus for generating a computer graphics animation as recited in item (32), wherein in determining two times and performing an interpolation between the two times, the velocity is given to the interpolation start point, the position is given to the interpolation end point, and the position at each time point for each axis between the start and end points is expressed by a first order parameter representation.

43. A method and apparatus for generating a computer graphics animation as recited in item (32), wherein in designating the facing direction of an object, two or more times are designated, one of the rotary angle, angular velocity, and rotary angle and angular velocity, respectively of the object, at a designated time, is designated, and a computer automatically generates rotary angles between designated times.

44. A method and apparatus for generating a computer graphics animation as recited in items (8) and (32), wherein in designating the facing direction of an object, a rotary angle and angular velocity are given to each axis, and a computer performs an interpolation calculation for each axis.

45. A method and apparatus for generating a computer graphics animation as recited in item (43), wherein for the computer to automatically generating a rotary angle, two times are determined to perform an interpolation between the two times, and interpolation sections are coupled together to generate all rotary angles.

46. A method and apparatus for generating a computer graphics animation as recited in item (45), wherein in determining two times and performing an interpolation between the two times, the rotary angles and angular velocities at an interpolation start point and end point are given, and the rotary angle at each time point for each axis between the start and end points is expressed by a third order parameter representation.

47. A method and apparatus for generating a computer graphics animation as recited in item (45), wherein in determining two times and performing an interpolation between the two times, the rotary angle and angular velocity are given to the interpolation start point, the rotary angle is given to the interpolation end point, and the rotary angle at each time point for each axis between the start and end points is expressed by a second order parameter representation.

48. A method and apparatus for generating a computer graphics animation as recited in item (45), wherein in determining two times and performing an interpolation between the two times, the rotary angle is given to the interpolation start point, the rotary angle and angular velocity are given to the interpolation end point, and the rotary angle at each time point for each axis between the start and end points is expressed by a second order parameter representation.

49. A method and apparatus for generating a computer graphics animation as recited in item (45), wherein in determining two times and performing an interpolation between the two times, the rotary angle and angular velocity are given to the interpolation start point, the angular velocity is given to the interpolation end point, and the rotary angle at each time point for each axis between the start and end points is expressed by a second order parameter representation.

50. A method and apparatus for generating a computer graphics animation as recited in item (45), wherein in determining two times and performing an interpolation between the two times, the rotary angle is given to the interpolation start point, the rotary angle and angular velocity are given to the interpolation end point, and the rotary angle at each time point for each axis between the start and end points is expressed by a second order parameter representation.

51. A method and apparatus for generating a computer graphics animation as recited in item (45), wherein in determining two times and performing an interpolation between the two times, the rotary angle and angular velocity are given to the interpolation start point, no information is given to the interpolation end point, and the rotary angle at each time point for each axis between the start and end points is expressed by a first order parameter representation.

52. A method and apparatus for generating a computer graphics animation as recited in item (45), wherein in determining two times and performing an interpolation between the two times, no information is given to the interpolation start point, the rotary angle and angular velocity are given to the interpolation end point, and the rotary angle at each time point for each axis between the start and end points is expressed by a first order parameter representation.

53. A method and apparatus for generating a computer graphics animation as recited in item (45), wherein in determining two times and performing an interpolation between the two times, the rotary angle is given to the interpolation start point, the rotary angle is given to the interpolation end point, and the rotary angle at each time point for each axis between the start and end points is expressed by a first order parameter representation.

54. A method and apparatus for generating a computer graphics animation as recited in item (45), wherein in determining two times and performing an interpolation between the two times, the rotary angle is given to the interpolation start point, the angular velocity is given to the interpolation end point, and the rotary angle at each time point for each axis between the start and end points is expressed by a first order parameter representation.

55. A method and apparatus for generating a computer graphics animation as recited in item (45), wherein in determining two times and performing an interpolation between the two times, the angular velocity is given to the interpolation start point, the rotary angle is given to the interpolation end point, and the rotary angle at each time point for each axis between the start and end points is expressed by a first order parameter representation.

56. A method and apparatus for generating a computer graphics animation as recited in item (43), wherein for the computer to automatically generate a rotary angle, there is provided a restriction condition for the control of the facing direction of an object, and a computer automatically generates all rotary angles.

57. A method and apparatus for generating a computer graphics animation as recited in item (56), wherein the restriction condition controls the facing direction of an object so as to be always directed to one of a certain point and another object.

58. A method and apparatus for generating a computer graphics animation as recited in item (56), wherein the restriction condition controls the facing direction of an object so as to be always in parallel with a line extending from the object perpendicular to a straight line.

59. A method and apparatus for generating a computer graphics animation as recited in item (56), wherein the restriction condition controls the facing direction of an object so as to be always in parallel with a normal line of a certain plane.

60. A method and apparatus for generating a computer graphics animation as recited in item (56), wherein the restriction condition controls the facing direction of an object so as to be always directed to the direction of a velocity of the object.

61. A method and apparatus for generating a computer graphics animation as recited in any one of items (57), (58), and (59), wherein the point, straight line, and plane are expressed in terms of an absolute coordinate system.

62. A method and apparatus for generating a computer graphics animation as recited in any one of items (57), (58), and (59), wherein the point, straight line, and plane are expressed in terms of a coordinate system of another object.

We claim:

1. An apparatus for generating a motion image of an object, comprising:

a motion path generator designating start point information representing a motion start point of a moving object and end point information representing a motion end point of the moving object, and generating information representing a motion path from the motion start point to the motion end point of the object by referring to the designated start point information and the designated end point information;

a memory storing, as said start point information for said motion start point and as said end point information for said motion end point, time information indicating a passing time of the moving object, position information indicating a passing position, velocity vector information indicating a passing velocity and a direction of the moving object, position designation information indicating whether a value of the position information has been explicitly designated, and velocity vector designation information indicating whether a value of the velocity vector information has been explicitly designated; and means for identifying whether the position information at the motion start point and the position information at the motion end point have been explicitly designated, and whether the velocity vector information at the motion start point and the velocity vector information at the motion end point have been explicitly designated;

wherein said path generator generates said motion path information in response to information stored in said memory, said motion path information corresponding to whether the position information has been explicitly designated and whether the velocity vector information has been explicitly designated.

2. An apparatus according to claim 1, wherein said motion path generator stores the motion path information of the object as a polynomial with time variables, wherein an order of the polynomial is determined in accordance with the quantity of information corresponding to whether the position information has been explicitly designated and whether the velocity vector information has been explicitly designated, and coefficients of said polynomial are calculated to meet said designated information.

3. An apparatus according to claim 1, further comprising:

at least one display displaying a motion path of the object, the displayed motion path being a line indicating the motion path information determined by said motion path generator, a time sequence line indicating a time sequence, a position icon representing position information at a corresponding position for which said position information has been designated, and a vector icon representing velocity vector information at a corresponding position for which said velocity vector information has been designated; and time base means displaying a key frame icon representing designation of information at a position on said time sequence line indicating a time at which said position information has been designated or at which said velocity vector information has been designated.

4. An apparatus according to claim 3, further comprising an input device performing a motion change operation to said position icon, vector icon and key frame icon, said input device changing information corresponding to said position icon, said velocity vector icon and said key frame icon as input to cause said path generator to re-calculate the motion path information.

5. An apparatus according to claim 4, wherein said input device designates a position or time on said motion path and designates a division of said motion path into two separate motion paths, and in accordance with said designated position or time and said motion path generator determines position and velocity vector information at the designated position or time from said motion path information to newly generate said position information and velocity vector information corresponding to new start and end points of said two separate motions paths.

6. An apparatus for generating a motion path of an object according to claim 1, further comprising:

means for determining a path based on information relating to a start position and an end position of motion of an object and based on information relating to a velocity and a direction of motion of the object; and means for determining a facing direction of the moving object on the path as a bounded point determined by information representing bounded conditions set for each object, the facing direction corresponding to a direction of movement of the object at the point.

7. An apparatus for generating a motion path of an object according to claim 6, further comprising means for selecting as the point a point closest to a designated line or plane, wherein the facing direction is perpendicular to the designated line or plane.

8. A computer implemented method for generating a motion image of an object, comprising steps of:

designating information representing a time and at least one of a position and velocity vector of the object at the motion start point and at the motion end point storing designation information indicating which of the position and/or velocity vector of the object have been explicitly designated for the motion start point and for the motion end point;

identifying whether the position information at the motion start point and the position information at the motion end point have been explicitly designated, and whether the velocity vector information at the motion start point and the velocity vector information at the motion end point have been explicitly designated; and selecting an interpolation formula for the motion path having a nominal number of an order higher than one, the number of the order being selected such that the number of the order corresponds to the identified information and provides a velocity function which is continuous with time between said motion start point and said motion end point, to thereby determine the interpolation formula; and generating a motion path between said motion start point and said motion end point of said object using said identified information and said interpolation formula.

9. A computer implemented method according to claim 8, further comprising a step of displaying the information representing the time, position and velocity of the object at the motion start point only when position information or velocity information has been explicitly designated for the motion start point and at the motion end point only when position information or velocity information has been explicitly designated for the motion end point.

10. A computer implemented method according to claim 8, further comprising a step of changing the time, position and velocity of the object at the motion start point only when position information or velocity information has been explicitly designated for the motion start point and at the motion end point only when position information or velocity information has been explicitly designated for the motion end point.

11. A computer implemented method according to claim 8, further comprising a step of determining information representing any of the position and velocity of the object motion at the motion start point and at the motion end point which have not been explicitly designated, based on the determined interpolation formula.

12. A computer implemented method according to claim 8, further comprising a step of automatically setting the information representing the time, position and velocity of the object at the motion start point and the motion end point which have not been explicitly designated.

13. A computer implemented method according to claim 12, further comprising a step of generating an optimal interpolation path in accordance with the designated information and the automatically set information.

14. A computer implemented method according to claim 8, further comprising a step of generating an optimal interpolation path in accordance with the designated information.

15. A computer implemented method for generating a motion image of an object, comprising steps of:

designating start point information representing a motion start point of a moving object and end point information representing a motion end point of the moving object;

generating information representing a motion path from the motion start point to the motion end point of the object by referring to the designated start point information and the designated end point information;

storing in a memory, as said start point information for said motion start point and as said end point information for said motion end point, time information indicating a passing time of the moving object, position information indicating a passing position, velocity vector information indicating a passing velocity and a direction of the moving object, position designation information indicating whether a value of the position information has been explicitly designated, and velocity vector designation information indicating whether a value of the velocity vector information has been explicitly designated;

identifying whether the position information at the motion start point and the position information at the motion end point have been explicitly designated, and whether the velocity vector information at the motion start point and the velocity vector information at the motion end point have been explicitly designated; and generating said motion path information in response to information stored in said memory, said motion path information corresponding to whether the position information has been explicitly designated and whether the velocity vector information has been explicitly designated.

16. A computer implemented method according to claim 15, further comprising a step of storing the motion path information of the object as a polynomial with time variables, wherein an order of the polynomial is determined in accordance with the quantity of information corresponding to whether the position information has been explicitly designated and whether the velocity vector information has been explicitly designated, and coefficients of said polynomial are calculated to meet said designated information.

17. A computer implemented method according to claim 15, further comprising steps of:

displaying a motion path of the object, the motion path being a line indicating the motion path information determined by said designating and generating steps, a time sequence line indicating a time sequence, and a position icon representing position information at a corresponding position for which said position information has been designated;

displaying a vector icon representing velocity vector information at a corresponding position for which said velocity vector information has been designated; and displaying a key frame icon representing designation of information at a position on said time sequence line indicating a time at which said position information has been designated or at which said velocity vector information has been designated.

18. A computer implemented method according to claim 17, further comprising a step of performing a motion change operation to said position icon, vector icon and key frame icon, said input device changing information corresponding to said position icon, said velocity vector icon and said key frame icon as input to cause said path generator to re-calculate the motion path information.

19. A computer implemented method according to claim 18, further comprising steps of:

designating a position or time on said motion path; and designating a division of said motion path into two separate motion paths, and in accordance with said designated time and said generated information determining position and velocity vector information at the designated position or time from said motion path information to newly generate said position information and velocity vector information corresponding to new start and end points of said two separate motion paths.

20. A computer implemented method for generating a motion path of an object according to claim 15, further comprising steps of:

determining a path based on information relating to a start position and an end position of motion of an object and based on information relating to a velocity and a direction of motion of the object; and determining a facing direction of the moving object on the path as a bounded point determined by information representing bounded conditions set for each object, the facing direction corresponding to a direction of movement of the object at the point.

21. A computer implemented method for generating a motion path of an object according to claim 20, further comprising a step of selecting as the point a point closest to a designated line or plane, wherein the facing direction is perpendicular to the designated line or plane.

* * * * *

UNITED STATES PATENT AND TRADEMARK OFFICE
CERTIFICATE OF CORRECTION

PATENT NO. : 5,717,848                                  Page 1 of 2
DATED       : February 10, 1998
INVENTOR(S) : Norito WATANABE, et al.

It is certified that error appears in the above-indentified patent and that said Letters Patent is hereby corrected as shown below:

Column 1, line 42, change "of" to --for--.

Column 5, line 3, change "Vector" to --vector--.

Column 9, line 21, change "ELS" to --HLS--.

Column 9, line 28, change "ELS" to --HLS--.

Column 9, line 41, delete "an" before "surface".

Column 10, line 3, change "ELS" to --HLS--.

Column 10, line 15, change "ELS" to --HLS--.

Column 14, line 24, change "Order" to --order--.

Column 19, line 65, change "(wxs, wys,..." to --(Wxs, Wys,...--.

Column 28, line 46, change "(H, ed, S)" to --(H, ad, S)--.

Column 28, line 47, change "(H, ad, S)" to --(H, asL, BsS)--.

UNITED STATES PATENT AND TRADEMARK OFFICE
CERTIFICATE OF CORRECTION

PATENT NO.   : 5,717,848
DATED        : February 10, 1998
INVENTOR(S)  : Norito WATANABE, et al.

It is certified that error appears in the above-indentified patent and that said Letters Patent is hereby corrected as shown below:

Column 29, line 45, delete the hyphen between "determined" and "using".

Column 32, line 23, after "respectively" insert a comma.

Column 32, line 38, after "respectively" insert a comma.

Column 36, line 1, change "generating" to --generate--.

Signed and Sealed this

Twentieth Day of October, 1998

Attest:

BRUCE LEHMAN

Attesting Officer

Commissioner of Patents and Trademarks